United States Patent
Kulkarni et al.

(10) Patent No.: US 11,496,552 B2
(45) Date of Patent: *Nov. 8, 2022

(54) INTENT TRACKING FOR ASYNCHRONOUS OPERATIONS

(71) Applicant: Dropbox, Inc., San Francisco, CA (US)

(72) Inventors: Vrushali Kulkarni, Foster City, CA (US); Braden Walker, San Francisco, CA (US); David Wetterau, San Francisco, CA (US); David Aeschlimann, San Francisco, CA (US); Luan Dos Santos, Sammamish, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/474,958

(22) Filed: Sep. 14, 2021

(65) Prior Publication Data

US 2022/0321640 A1 Oct. 6, 2022

Related U.S. Application Data

(63) Continuation of application No. 17/217,600, filed on Mar. 30, 2021, now Pat. No. 11,134,119.

(51) Int. Cl.
*H04L 67/10* (2022.01)
(52) U.S. Cl.
CPC .................................. *H04L 67/10* (2013.01)
(58) Field of Classification Search
CPC ...................................................... H04L 67/10
See application file for complete search history.

(56) References Cited

U.S. PATENT DOCUMENTS

| 7,890,469 | B1 | 2/2011 | Maionchi et al. |
| 8,005,795 | B2 * | 8/2011 | Galipeau ............... G06F 16/221 |
| | | | 707/648 |

(Continued)

FOREIGN PATENT DOCUMENTS

| CN | 103200373 A | * | 7/2013 | ........... G06F 1/3203 |
| CN | 109196532 A | * | 1/2019 | ......... G06Q 10/0631 |

(Continued)

OTHER PUBLICATIONS

Notice of Allowance from U.S. Appl. No. 17/217,600, dated Jul. 26, 2021, 9 pages.

(Continued)

*Primary Examiner* — Shean Tokuta
(74) *Attorney, Agent, or Firm* — Polsinelli PC

(57) ABSTRACT

Systems and methods are provided for intent tracking asynchronous operations. An example method can include receiving, at a content management system (CMS), a first request to perform an operation on a content item stored at the CMS; adding the request to perform the operation to a queue of operations to be processed by the CMS; and prior to completing the operation: receiving, from a client device associated with a user account registered at the CMS, a second request to access the content item; in response to the second request, determining a predicted state of the content item, the predicted state of the content item reflecting a result of performing the operation on the content item; and providing, to the client device, a response including the predicted state of the content item.

18 Claims, 11 Drawing Sheets

(56) References Cited

U.S. PATENT DOCUMENTS

| | | | |
|---|---|---|---|
| 8,010,498 B2 | 8/2011 | Gounares et al. | |
| 8,082,334 B1* | 12/2011 | Oscherov | G06F 16/93 |
| | | | 709/219 |
| 9,361,306 B1* | 6/2016 | Pawar | G06F 16/1865 |
| 9,459,814 B1* | 10/2016 | Hasegawa | G06F 3/0682 |
| 10,007,459 B2 | 6/2018 | Fernandez et al. | |
| 10,248,374 B2* | 4/2019 | Kominac | G06F 9/452 |
| 10,447,743 B2* | 10/2019 | Shin | G06F 16/9535 |
| 10,665,006 B2 | 5/2020 | Ramani et al. | |
| 10,795,337 B2 | 10/2020 | Bowers et al. | |
| 10,846,269 B2 | 11/2020 | Besen et al. | |
| 10,911,518 B2 | 2/2021 | Houston et al. | |
| 11,134,119 B1* | 9/2021 | Kulkarni | H04L 67/1097 |
| 2003/0126163 A1* | 7/2003 | Kim | G06F 11/1435 |
| 2007/0073831 A1* | 3/2007 | Oscherov | H04L 67/1021 |
| | | | 709/217 |
| 2007/0106858 A1* | 5/2007 | Galipeau | G06F 16/178 |
| | | | 711/162 |
| 2011/0295812 A1* | 12/2011 | Galipeau | G06F 11/2097 |
| | | | 707/E17.005 |
| 2013/0226876 A1 | 8/2013 | Gati et al. | |
| 2013/0339313 A1* | 12/2013 | Blaine | G06F 11/0727 |
| | | | 707/691 |
| 2014/0201434 A1* | 7/2014 | Hassan | G06F 12/16 |
| | | | 711/104 |
| 2014/0222917 A1 | 8/2014 | Poirier | |
| 2014/0250148 A1* | 9/2014 | Eichhorn | G06F 16/148 |
| | | | 707/770 |
| 2015/0244794 A1 | 8/2015 | Poletto et al. | |
| 2016/0125070 A1* | 5/2016 | Snell | G06F 16/289 |
| | | | 707/722 |
| 2016/0234691 A1* | 8/2016 | Jeong | H04W 12/086 |
| 2016/0299937 A1* | 10/2016 | Crockett | G06F 16/1873 |
| 2017/0054771 A1* | 2/2017 | Shin | H04L 67/306 |
| 2017/0054802 A1* | 2/2017 | Annamalai | G06F 16/248 |
| 2017/0075698 A1* | 3/2017 | Zamir | G06F 9/4416 |
| 2017/0083652 A1* | 3/2017 | Larzul | G06F 30/331 |
| 2018/0107674 A1* | 4/2018 | Cantwell | G06F 16/128 |
| 2018/0307853 A1* | 10/2018 | Mehta | G06F 16/9027 |
| 2020/0065313 A1 | 2/2020 | Patel et al. | |
| 2020/0259898 A1* | 8/2020 | Dhuse | G06F 3/0656 |
| 2020/0265010 A1* | 8/2020 | Lee | G06F 16/1734 |
| 2021/0034642 A1 | 2/2021 | Lai | |

FOREIGN PATENT DOCUMENTS

| | | | |
|---|---|---|---|
| CN | 109299049 A | * 2/2019 | |
| CN | 112988620 A | * 6/2021 | G06F 3/0613 |
| JP | 4842279 B2 | * 12/2011 | G06F 16/1774 |
| WO | WO-2015069038 A1 | * 5/2015 | H04L 63/10 |

OTHER PUBLICATIONS

International Search Report and Written Opinion for PCT Application No. PCT/US2021/072466 dated Feb. 10, 2022, 11 pages.

* cited by examiner

INTENT TRACKING FOR ASYNCHRONOUS OPERATIONS

CROSS-REFERENCE TO RELATED APPLICATIONS

This application is a continuation of U.S. application Ser. No. 17/217,600, filed on Mar. 30, 2021, entitled, INTENT TRACKING FOR ASYNCHRONOUS OPERATIONS, which is hereby expressly incorporated herein by reference in its entirety.

TECHNICAL FIELD

The present technology pertains to distributed storage, collaboration and synchronization systems.

BACKGROUND

Cloud storage systems allow users to store and access data on the cloud. Some cloud storage systems allow users to share data with other users and access the data in a collaborative fashion. In some cases, users may also store and access local copies of the data on their client devices. The local copies of the data may provide users with faster access to the data. Additionally, the local copies can allow the users to access the data when the users are offline. Cloud storage systems may also allow users to synchronize their local copies of the data with the data on the cloud to ensure consistency. For example, a cloud storage system may synchronize copies of data across a number of client devices and servers so each copy of data is identical. However, synchronization of data across multiple devices can be an extremely difficult task, often resulting in data inconsistencies, undesirable effects, and even loss of data.

BRIEF DESCRIPTION OF THE DRAWINGS

Illustrative embodiments of the present application are described in detail below with reference to the following figures.

DETAILED DESCRIPTION

Figure 1:
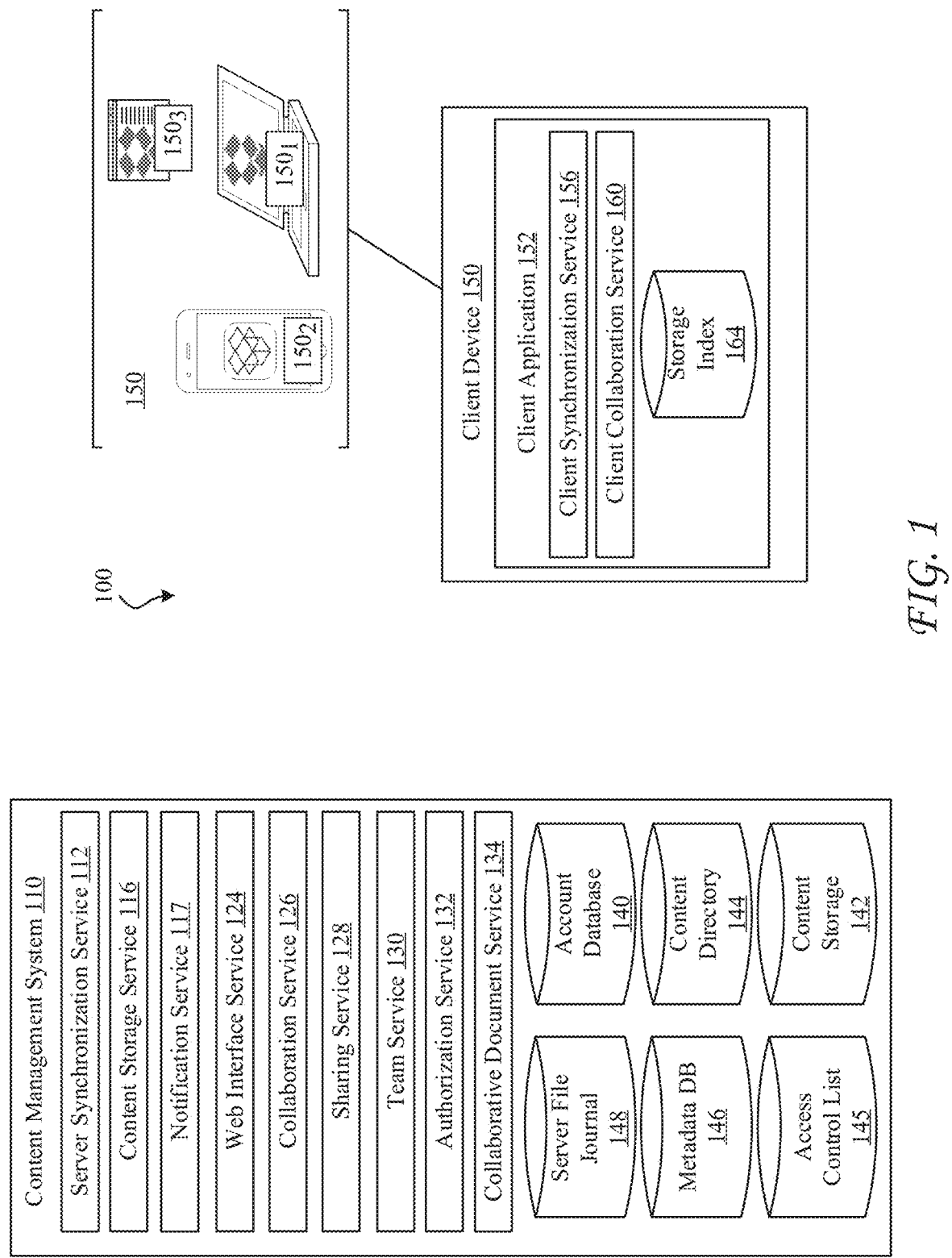
FIG. 1 is a diagram showing an example of a content management system and client devices, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Cloud storage systems allow users to store and access content items across multiple devices. The content items may include, but are not limited to, files, documents, messages (e.g., email messages, text messages, comments, notifications, etc.), media files (e.g., images, videos, audio files, etc.), folders, objects, and/or any other unit and/or type of digital content. Content items may be shared with multiple users who can interact with the shared content items and/or collaborate with each other through the shared content items. Moreover, users can perform one or more content item operations such as, for example and without limitation, adding/storing a content item, modifying a content item, deleting a content item, renaming a content item, moving a content item, sharing a content item, copying a content item, viewing a content item, mounting a content item (e.g., a share or namespace), partitioning a content item, encrypting a content item, etc.

However, synchronizing content items shared or stored across several devices and user accounts can be very difficult and is often flawed, prone to errors/inconsistencies, and rife with technical obstacles. To illustrate, a first machine (e.g., a client device or server) may send communications to a second machine that provides information about a user's modification of content items on a cloud storage system. These communications may be used by the second machine to synchronize the content items on the second machine such that actions performed on content items on the first machine are reflected in content items on the second machine, and the content items on the first machine are identical or substantially identical to the content items on the second machine.

In many cases, there may be several communications sent between various machines storing local copies of one or more content items. Such communications may be difficult to manage. Moreover, some of the communications may be received out of order as a result of various issues, such as client or network problems. This often results in conflicts and errors between content items at the various machines. The user's activity may also generate a large number of revisions which can further complicate synchronization efforts and exacerbate inconsistencies. For example, a user may perform a large number of modifications to various content items, undo modifications in a short period of time, or quickly perform additional modifications to a previously modified content item. This increases the likelihood that changes and revisions from users are received out of order, causing outdated modifications and conflicting content items. As a result, some operations may not be compatible with the current state of the content items, and it can be extremely difficult to detect whether operations are in conflict. Moreover, at any point in time, the state of a copy of a content item on one machine may differ from the state of another copy of that content item on another machine.

There is also an inherent latency with synchronization actions. For example, actions taken on the first machine are first detected by the first machine, and a communication is then generated and transmitted through a network. The communication can include a synchronization action for updating one or more copies of a content item(s) based on the actions taken on the first machine. The communication can be received by a second machine that may still be processing previous communications corresponding to other actions performed on the one or more copies of the content item(s). To avoid conflicts between actions, the second machine can attempt to complete the actions detailed in the previous communications before implementing the synchronization actions associated with the communication received based on the actions taken on the first machine.

However, in this illustrative scenario, there are several possible points of latency, including, among others, the first machine, the second machine, and the network. As latency increases, the likelihood of conflicts between copies of content items can also increase. Processing such conflicted communications and resolving conflicts are extremely difficult and computationally expensive tasks. Moreover, because of the potential latencies and/or any delays in synchronizing content item copies across devices, at any point in time, the state of a copy of a content item on one machine can potentially differ from the state of another copy of that content item on another machine. This can result in differences in what users see when accessing their respective copies of the content item from their machines. Such variations in the state of content item copies at different machines can result in outdated or inaccurate content at some machines, can lead a user at a machine to believe a data loss and/or other data issue has occurred, and can significantly impact the content and/or collaboration experience of users.

For example, if a user at the second machine tries to access a folder before a move operation performed on the folder at the first machine is fully propagated to the second machine, the user at the second machine might see the folder as it was prior to the move or may see intermediate results of the move, which can result in various discrepancies and/or inconsistencies. To illustrate, the user at the second machine may see the folder including some items in the folder that have not been moved as part of a synchronization operation in progress, while other items in the folder may appear missing if such items have already been moved as part of the synchronization operation. The user may even be unaware of the move operation performed on the folder or the synchronization operation in progress, and may believe a partial data loss has occurred.

Moreover, additional state and synchronization complexity can be introduced when the same or different user on a machine and/or other machines with access to the content item makes modifications to the same content item. Additional technical issues can also arise when content items are modified locally and remotely in a large collaboration environment. These issues can quickly multiply and grow in complexity, creating a wide array of problems and inconsistencies in the content items.

The technologies disclosed herein can address, among other things, the foregoing problems and challenges in distributed storage systems (e.g., cloud storage systems, etc.), and can improve synchronization performance, accuracy, timing, and efficiency in distributed storage systems. For example, as previously noted, accurately synchronizing the state of content items accessed and/or modified by users from different devices in a distributed storage environment can be very difficult for a variety of reasons such as, for example, the large amount of relevant user activity and content item revisions, data dependencies, user account permissions, network and device latencies, potential content item conflicts, etc. To further complicate these challenges, in some cases, there are often timing (and/or efficiency) issues/considerations that can impact the performance, accuracy, reliability, etc., of synchronization and/or collaboration communications and operations.

For example, delays and/or latencies in synchronization communications, operations, etc., can increase the amount of potential conflicts, inaccuracies, staleness and/or errors in content items (and/or associated state data) stored/accessed across different devices. In many cases, latencies, delays and/or inefficiencies in processing activity (e.g., revisions, synchronization operations, communications, etc.) from different devices, calculating synchronized states of content items, and propagating synchronized states of content items across devices can result in inconsistencies between the state of content items observed from different devices and/or user accounts. If the state of a content item is not synchronized and/or accurately rendered in a timely and/or efficient manner, users may observe what appears as a data loss and/or may be temporarily unable to access a content item that has not been fully synchronized to the user's device and/or does not reflect a current state at the user's device.

The technologies disclosed herein can improve the performance, accuracy, timing, and/or efficiency of synchronization operations in distributed storage systems. The technologies disclosed herein can also increase the accuracy, freshness, and/or timeliness of the state of content items stored, accessed, and/or rendered across different devices. For example, these and other synchronization improvements in distributed storage systems can prevent and/or reduce errors, staleness, inconsistencies, etc., in the state of shared content items that are stored, accessed, and/or rendered at different devices, which are problems often experienced by users in distributed storage systems.

In some examples, the technologies disclosed herein can compute and track the intended state of content items that will be affected by operations that are in progress and/or incomplete. The technologies disclosed herein can use the intended state to provide users requesting access to a content item associated with an in-progress or incomplete operation a predicted state of the content item. The predicted state can reflect what the user should see after the operation completes. This can ensure that content items on a user's account appear according to their state after an operation(s) that is in progress or incomplete, and can prevent or eliminate potential discrepancies, inconsistencies, and other issues in the content items presented to a user when an operation is in progress and/or incomplete.

In some examples, the disclosed technologies are deployed in the context of a content management system having content item synchronization capabilities and collaboration features, among others. An example system configuration 100 is shown in FIG. 1, which depicts content management system 110 interacting with client device 150.

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some examples, content storage 142 is combined with other types of storage or databases to handle specific functions.

Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some examples, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some examples, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some examples, the unique ID (also referred to as an object ID), which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some examples, the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file paths, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface.

While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In some examples, client devices are associated with an account of content management system 110, but in some examples client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In examples wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content storage service 116. In some examples, client synchronization service 156 can perform some functions of content storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some examples, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc., as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some examples, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some examples, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Another example feature of content management system 110 is to facilitate collaboration between users. Collaboration features include content item sharing, commenting on content items, co-working on content items, instant messaging, providing presence and seen state information regarding content items, etc.

Content management system 110 can manage sharing content via sharing service 128. Sharing content by providing a link to the content can include making the content item accessible from any computing device in network communication with content management system 110. However, in some examples, a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110, sharing service 128 can add a user account identifier or multiple user account identifiers to a content entry in access control list 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list 145. For example, in some examples, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

Sharing service 128 can also be configured to record in access control list 145 that a URL to the content item has been created. In some examples, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some cases, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some cases, limited permissions include restrictions that only permit a content item to be accessed from with a specified domain, e.g., from within a corporate network domain, or by accounts associated with a specified domain, e.g., accounts associated with a company account (e.g., @acme.com).

In some examples, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some examples, content management system 110 can designate a URL for uploading a content item. For example, a first user with a user account can request such a URL, provide the URL to a contributing user and the contributing user can upload a content item to the first user's user account using the URL.

In some examples, content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Team service 130 can provide a common shared space for the team, private user account folders, and access limited shared folders. Teams service can also provide a management interface for an administrator to manage collections and content items within team, and can manage user accounts that are associated with the team.

In some examples, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g., a user account with user rights and administrator rights) authorization service 132 can also require explicit privilege escalation to avoid unintentional actions by administrators.

In some examples, content management system can provide information about how users with which a content item is shared are interacting or have interacted with the content item. In some examples, content management system 110 can report that a user with which a content item is shared is currently viewing the content item. For example, client collaboration service 160 can notify notification service 117 when client device 150 is accessing the content item. Notification service 117 can then notify any client devices of other users having access to the same content item of the presence of the user of client device 150 with respect to the content item.

In some examples, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc. In some examples, collaboration service 126 can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some examples, this can be managed by ensuring two users access a content item through a web interface and there they can work on the same copy of the content item at the same time.

In some examples, client collaboration service 160 can provide a native application companion interface for the purpose of displaying information relevant to a content item being presented on client device 150. In examples wherein a content item is accessed by a native application stored and executed on client device 150, where the content item is in a designated location of the file system of client device 150 such that the content item is managed by client application 152, the native application may not provide any native way to display the above addressed collaboration data. In such examples, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some examples, one or more of the services or storages/databases discussed above can be accessed using public or private application programming interfaces.

Certain software applications can access content storage 142 via an application programming interface (API) on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some examples, the application can include a content management system specific component. For example, the content management system specific component can be a stand-alone application (e.g., client application 152), one or more application plug-ins, and/or a browser extension. However, the user can also interact with content management system 110 via a third-party application, such as a web browser, that resides on client device 150 and is configured to communicate with content management system 110. In various implementations, the client-side application (e.g., client application 152) can present a user interface (UI) for a user to interact with content management system 110. For example, the user can interact with the content management system 110 via a file system explorer integrated with the file system or via a webpage displayed using a web browser application.

In some examples, client application 152 can be configured to manage and synchronize content for more than one account of content management system 110. In such examples, client application 152 can remain logged into multiple accounts and provide normal services for the multiple accounts. In some examples, each account can appear as folder in a file system, and all content items within that folder can be synchronized with content management system 110. In some examples, client application 152 can include a selector to choose one of the multiple accounts to be the primary account or default account.

While content management system 110 is presented with specific components, it should be understood by one skilled in the art that the architectural configuration of system 110 is simply one possible configuration and that other configurations with more or fewer components are possible. Further, a service can have more or less functionality, even including functionality described as being with another service. Moreover, features described herein with respect to an embodiment can be combined with features described with respect to another embodiment.

Figure 2A:
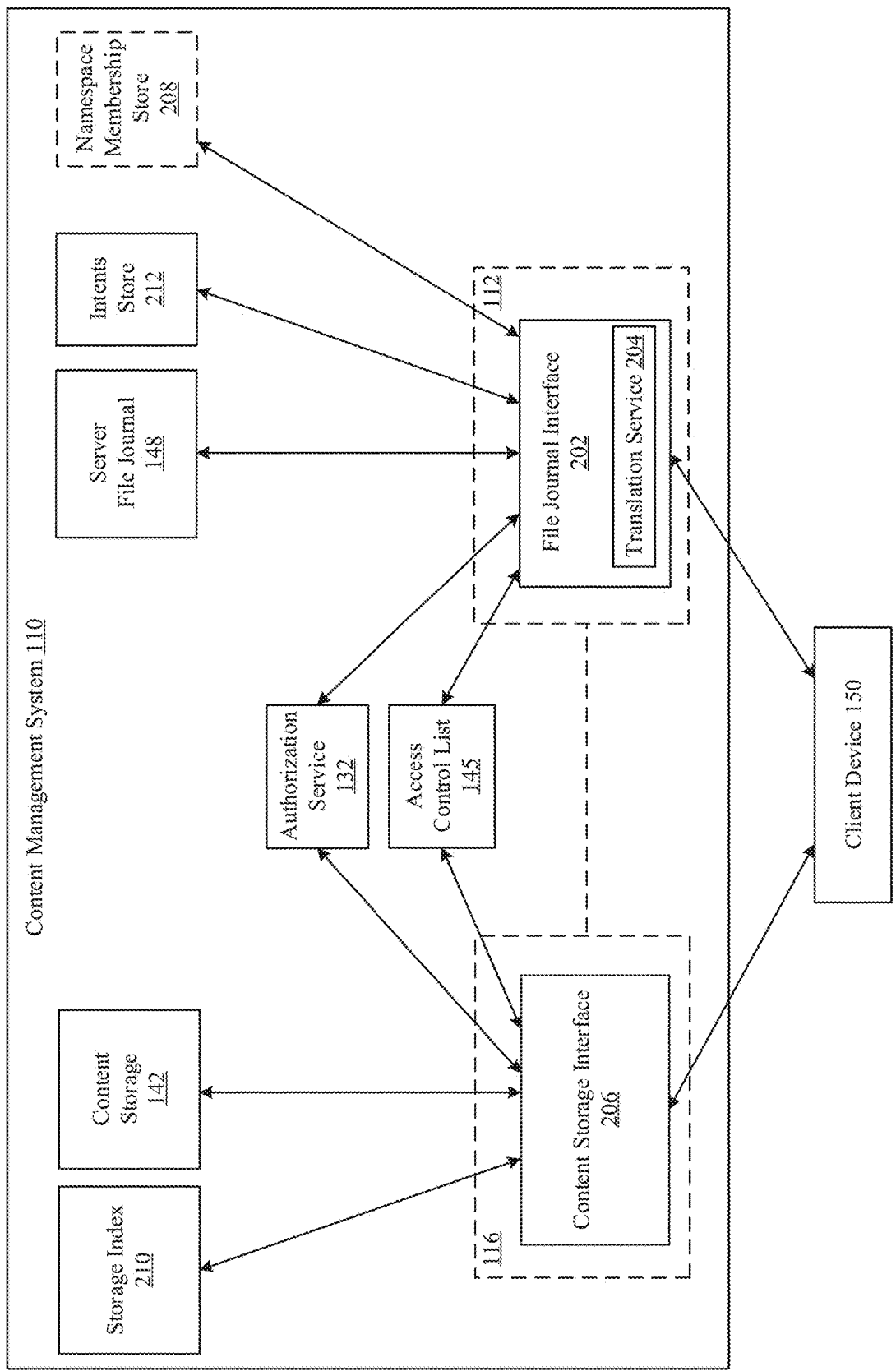
FIG. 2A is a diagram showing an example architecture for synchronizing content between a content management system and client devices, in accordance with some examples of the present disclosure.

FIG. 2A is a diagram showing an example architecture for synchronizing content between content management system 110 and client device 150 in system configuration 100. In this example, client device 150 interacts with content storage 142 via content storage interface 206, and with server file journal 148 and intents store 212 via file journal interface 202. In some cases, content storage interface 206 can be provided or managed by content storage service 116, and file journal interface 202 can be provided or managed by server synchronization service 112. For example, content storage interface 206 can be a subcomponent or subservice of content storage service 116, and file journal interface 202 can be a subcomponent or sub service of server synchronization service 112.

Content storage interface 206 can manage communications, such as content requests and/or interactions, between client device 150 and content storage 142. Content storage interface 206 can process requests from client device 150 to upload and download content to and from content storage 142. Content storage interface 206 can receive content requests (e.g., downloads, uploads, etc.) from client device 150, verify permissions in access control list 145, communicate with authorization service 132 to determine if client device 150 (and/or the request from client device 150) is authorized to upload or download content to or from content storage 142, and/or interact with content storage 142 to download and/or upload content from/to content storage 142.

For example, if a request from client device 150 to content storage interface 206 is a request to download a content item from content storage 142, content storage interface 206 can retrieve the requested content item from content storage 142 and provide the content item to client device 150. If the request from client device 150 is a request to upload a content item, content storage interface 206 can obtain the content item from client device 150 and upload the content item to content storage 142 for storage at the content management system 110.

Figure 2B:
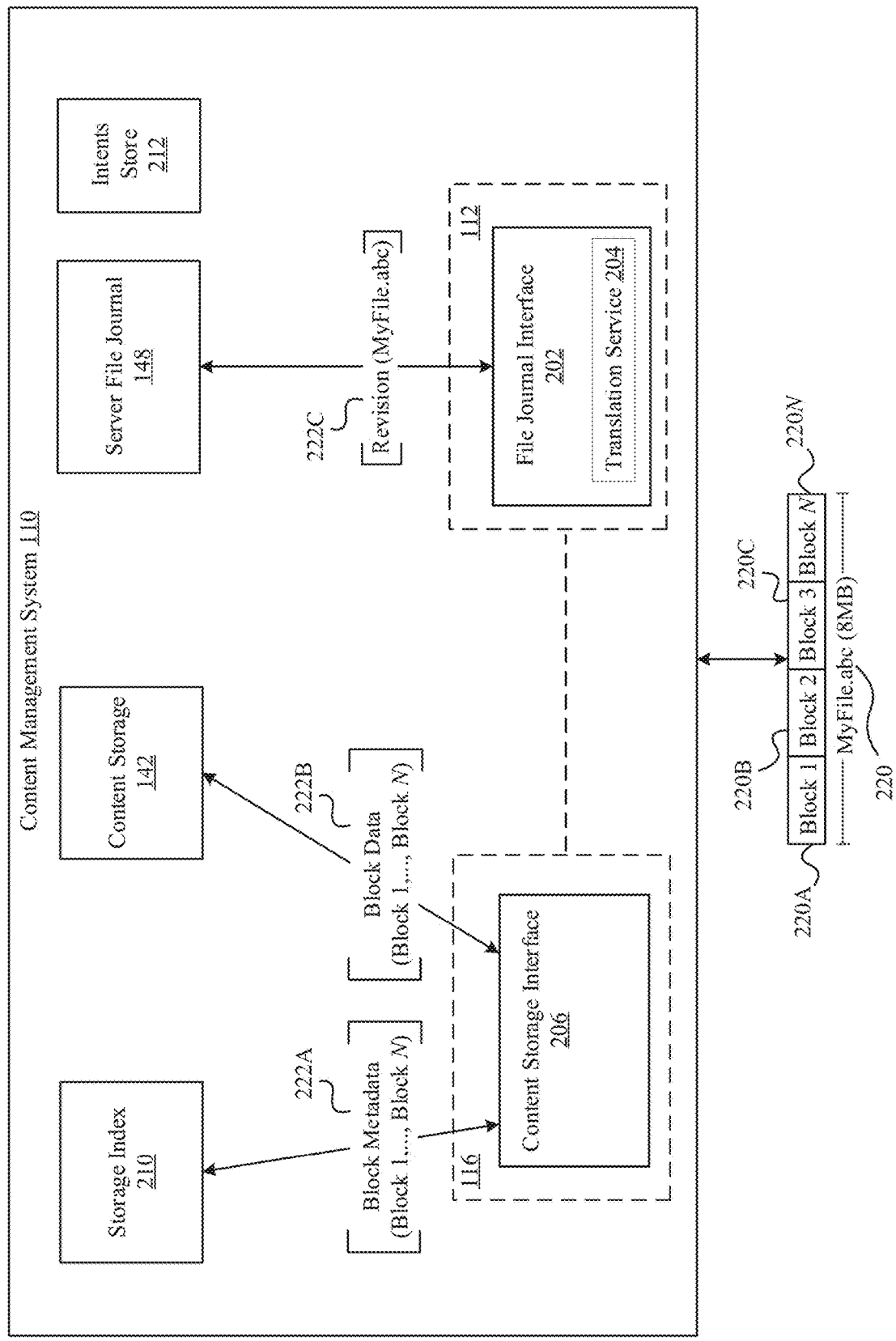
FIG. 2B is a diagram showing an example configuration for storing and tracking blocks of content items in an example architecture for synchronizing content between a content management system and client devices, in accordance with some examples of the present disclosure.

In some examples, when processing content requests from client device 150, content storage interface 206 can communicate with storage index 210 to check the availability and/or storage location of the requested content in content storage 142, and/or track content items in content storage 142. Storage index 210 can maintain an index of content items on content storage 142. The index can identify the content items on content storage 142 and/or a respective location of the content items within content storage 142. Thus, storage index 210 can track content items on content storage 142 as well as storage locations of the content items. Storage index 210 can track entire content items, such as files and folders, and/or portions of content items, such as blocks or chunks of a respective content item(s). In some cases, content items can be split into blocks or chunks that can be stored at content storage 142 and tracked in storage index 210. For example, content storage 142 can store a content item as blocks or chunks of data that include data portions of the content item. Storage index 210 can track the blocks or chunks of the content item stored in content storage 142. FIG. 2B described below illustrates an example configuration for storing and tracking blocks of content items.

File journal interface 202 can manage communications, such as metadata requests, content synchronizations, data operations, etc., between client device 150 and server file journal 148. For example, file journal interface 202 can translate, validate, authenticate, and/or process operations, configurations, and/or state information between client device 150 and server file journal 148. In some cases, file journal interface 202 can verify permissions from a toke, such as an authorization or "FSAuth" token, in a cursor or through authorization service 132 in order to authorize (and/or verify authorization of), requests sent by client device 150 to server file journal 148. When processing requests or operations from client device 150, file journal interface 202 can access namespace membership store 208 to determine or verify namespace ownership information for any namespaces associated with the requests or operations from client device 150, and retrieve permissions information from access control list 145 to verify permissions of content associated with the requests or operations from client device 150.

In some cases, translation service 204 in file journal interface 202 can perform linearization and/or translation operations for communications between client device 150 and server file journal 148. For example, translation service 204 can translate communications from client device 150 to a different format and/or state consistent with the structure and/or format of data in server file journal 148, and vice versa. To illustrate, in some cases, client device 150 can process content item information (e.g., state information, changes, versions, etc.) at client device 150 as operations, and server file journal 148 can process the same information as content item revisions reflected by rows in a data structure in server file journal 148, such as a database table(s). In some examples, to enable synchronization of content item information between client device 150 and server file journal 148, translation service 204 can translate operations from client device 150 into revisions suitable for server file journal 148, and can translate revisions reflected in rows of data on server file journal 148 to operations suitable for client device 150.

In some cases, authorization service 132 can generate a token that verifies or indicates that client device 150 is authorized to access, update, download, and/or upload a content item(s). The token can include, for example and without limitation, a device identifier associated with client device 150, an account identifier associated with a user account authenticated and/or authorized at client device 150, a session identifier associated with an authorized session at client device 150, a timestamp, a view context, access permissions to a content item(s), security data (e.g., an encryption key, a signature, etc.), request information, etc. In some cases, the token can be included in a cryptographically signed data object called a cursor.

Content management system 110 and/or authorization service 132 can send the token(s) to client device 150, and client device 150 can provide the token(s) to content management system 110 when requesting content item revisions and/or updates to server file journal 148 as further described below. Client device 150 can also provide the token(s) to content storage interface 206 to validate any content requests (e.g., downloads, uploads, etc.). Content storage interface 206 can use the token(s) to authorize queries to storage index 210, upload and/or download content items to or from content storage 142, etc.

For example, client device 150 can send to content storage interface 206 a request to upload a content item to content storage 142. The request can include the token and the content item to be uploaded. Content storage interface 206 can use the token to authorize a query to storage index 210 to check if the content item already exists in content storage 142, and authorize the upload of the content item to content storage 142. Client device 150 can also or alternatively provide the token to file journal interface 202 to authorize a request to store metadata on server file journal 148 to track the upload and revision of the content item.

Content management system 110 can also include an intents store 212. The intents store 212 can track a starting state associated with one or more content item operations and an end state associated with the one or more content item operations. For example, intents store 212 can track a state of a content item prior to a move operation and the state of the content item after the move operation. The end state tracked in the intents store 212 can include an actual end state and/or a predicted/projected end state, as further described below. In some examples, the intents store 212 can track a state of a source location (e.g., a source namespace/content item) and a destination location (e.g., a destination namespace/content item). For example, if the content management system 110 receives a request to move content item "Foo" from namespace 1 to namespace 2, the intents store 212 can track a state of namespace 1 before and/or after the move of content item "Foo", and a state of namespace 2 before and/or after the move of content item "Foo".

In some cases, intents store 212 can track a state of the source location and a predicted/projected state of the destination location. To illustrate, in the previous example, intents store 212 can track a state of namespace 1 before the content item "Foo" is moved from namespace 1 to namespace 2 based on the move operation, and a predicted/projected state of namespace 2 after the content item "Foo" is moved to namespace 2 based on the move operation. In some cases, content management system 110 can validate the one or more operations prior to including and/or committing a predicted/projected state(s) in intents store 212.

For example, content management system 110 can receive a request from user account A to move "Folder N" from location X to location Y. Content management system 110 can determine what the state will be at location X and location Y after the "Folder N" is moved to location Y. To illustrate, content management system 110 can determine that location X will no longer include "Folder N" and location Y will include "Folder N". Content management system 110 can also verify that user account A has access to location Y and/or permission to move "Folder N" from location X to location Y. If content management system 110 determines that user account A has access to location Y and/or permission to move "Folder N" from location X to location Y, content management system 110 can record the source state (e.g., the state of location X) and can also record a predicted/projected destination state (e.g., the state of location Y) after the move operation (e.g., after "Folder N" is moved from location X to location Y). In some cases, when determining a predicted/projected state, content management system 110 can verify permissions, determine chronological/timing information, and/or determine any atomic operations (and/or sequences of operations) involved in the requested operation(s).

With reference to the previous example, in some cases, if user account B requests to access "Folder N" from location X, content management system 110 can determine, from the information in intents store 212, that an operation to move "Folder N" from location X to location Y is in progress or has not completed. Before returning a response to user account B, content management system 110 can identify (e.g., from intents store 212) the predicted/projected state of "Folder N" (and/or location X and location Y) after the move. Content management system 110 can also verify the user account B has access to "Folder N" after the move (e.g., that user account B has access to "Folder N" at location Y). If user account B has access to "Folder N" after the move, content management system 110 can return a response to the access request from user account B that is based on the predicted/projected state.

For example, instead of providing the state of "Folder N" prior to completion of the move (e.g., "Folder N" stored at location X), content management system 110 can use the predicted/projected state in intents store 212 to modify the response to user account B to instead provide the predicted/projected state (e.g., "Folder N" stored at location Y). When user account B receives the response from content management system 110, the "Folder N" will appear to be located at location Y even though the move of "Folder N" from location X to location Y may not have completed when user account B sent the request to, and/or received the response from, content management system 110. In other words, content management system 110 can "fast forward" the state of a content item prior to completion of an operation on that content item, and in response to a request to access that content item, content management system 110 can provide the fast-forwarded state (e.g., instead of a starting or intermediate state) to a requesting user account that has the appropriate rights/permissions to access that content item after completion of the operation on that content item.

Intents store 212 can include a data structure for storing intents as described herein. For example, intents store 212 can include a database(s), a table(s), a log(s), and/or the like. In some cases, intents store 212 can be part of, and/or implemented by, server file journal 148. In other cases, intents store 212 can be implemented by content management system 110 separate from server file journal 148. For example, intents store 212 can be a separate and/or standalone data structure on a server(s), such as a database and/or database table.

In some examples, file journal interface 202 can provide client device 150 predicted/projected state information based on intents stored in intents store 212. In some cases, file journal interface 202 manage communications between client device 150 and intents store 212. In some examples, translation service and/or any other component of content management system 110 can determine predicted/projected states provided to client devices and/or stored in intents store 212.

FIG. 2B is a diagram showing an example block storage and synchronization configuration. In this example, content storage 142 can store blocks of data. In some examples, the blocks of data can be opaque chunks of content items of or up to a particular size. Content items can be split into blocks and the blocks can be stored at content storage 142 for access. Storage index 210 can track blocks stored at content storage 142, as well as the respective locations of the blocks stored at content storage 142. File journal interface 202 can interact with server file journal 148 to track revisions to the content items and/or blocks stored at content storage 142.

For example, content item 220 (e.g., MyFile.abc) can be split into blocks 220A, 220B, 220C, 220N. Content storage interface 206 can receive blocks 220A, 220B, 220C, 220N and send block data 222B to content storage 142 for storage at content storage 142. Block data 222B can include blocks 220A, 220B, 220C, 220N associated with content item 220.

Blocks 220A, 220B, 220C, 220N can be stored on one or more storage devices or volumes at content storage 142 and/or aggregated within one or more logical storage containers (e.g., buckets) or data clusters. In some cases, blocks 220A, 220B, 220C, 220N can be stored together on a same location (e.g., storage device, volume, container, and/or cluster). In other cases, some or all of blocks 220A, 220B, 220C, 220N can be stored on two or more different locations (e.g., two or more different storage devices, volumes, containers, and/or clusters).

Content storage interface 206 can also store block metadata 222A at storage index 210. Block metadata 222A can identify blocks 220A, 220B, 220C, 220N, and allows storage index 210 to track blocks 220A, 220B, 220C, 220N at content storage 142. Block metadata 222A can include an identifier for each block 220A, 220B, 220C, 220N. The identifier for a block can be a name or key, such as a hash of the block, which identifies the block.

Block metadata 222A can also include location information for blocks 220A, 220B, 220C, 220N, which indicates the respective storage location of blocks 220A, 220B, 220C, 220N. The location information of a block can identify the storage device or volume where the block is stored and/or a logical storage container or data cluster where the block is contained. The location information can be used to access or retrieve the associated block.

Content storage interface 206 can store block metadata 222A at storage index 210 before or after storing blocks 220A, 220B, 220C, 220N at content storage 142. For example, content storage interface 206 can store blocks 220A, 220B, 220C, 220N at content storage 142 and subsequently store block metadata 222A at storage index 210 to indicate that blocks 220A, 220B, 220C, 220N have been stored at content storage 142.

In some cases, content storage interface 206 can query storage index 210 prior to storing blocks 220A, 220B, 220C, 220N at content storage 142, to determine if (or where) blocks 220A, 220B, 220C, 220N are stored at content storage 142. For example, content storage interface 206 can query storage index 210 based on block metadata 222A to check if blocks 220A, 220B, 220C, 220N are stored at content storage 142. Storage index 210 can compare block identifiers in block metadata 222A with block identifiers at storage index 210 to check for any matches. A match between block identifiers indicates that an associated block is stored at content storage 142.

As previously mentioned, server file journal 148 tracks content item revisions, including content item adds, edits, moves, renames, deletes, etc. Accordingly, file journal interface 202 can store revision 222C at server file journal 148 to indicate that content item 220 and/or blocks 220A, 220B, 220C, 220N were added to content storage 142. Revision 222C can represent a revision of content item 220 within a journal of content item revisions at server file journal 148.

Revision 222C can identify content item 220 and an operation associated with content item 220, such as an add operation (e.g., upload), edit operation, move, operation, rename operation, delete operation, etc. Revision 222C can also identify a namespace in content management system 110 where content item 220 is stored, and a row in a journal of content item revisions at server file journal 148 for storing revision 222C. The row within the journal of content item revisions can represent a revision number associated with revision 222C for content item 220.

Figure 3A:
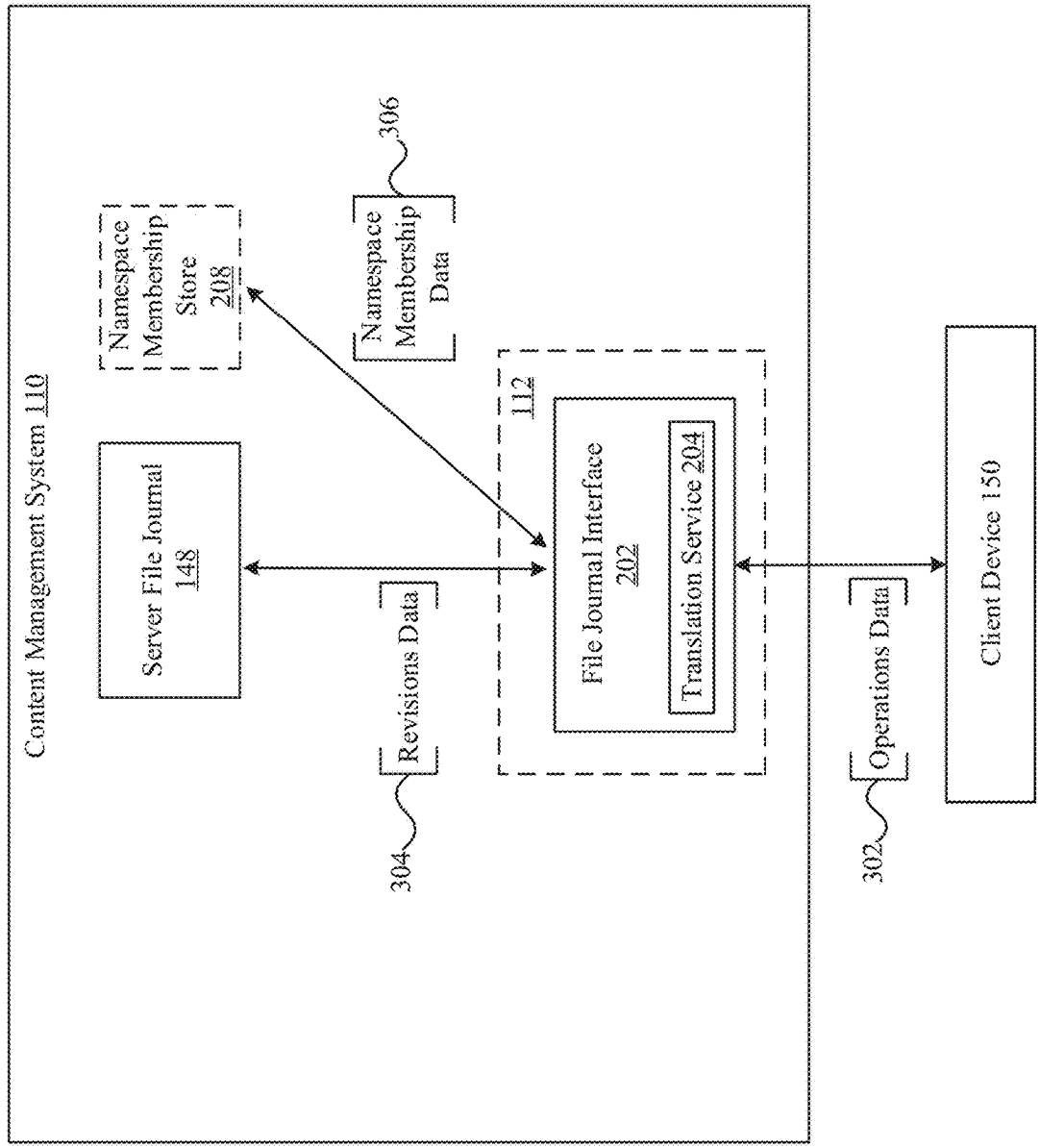
FIG. 3A is a diagram showing example communications processed by a file journal interface between a client device and a server file journal on a content management system, in accordance with some examples of the present disclosure.

FIG. 3A is a diagram showing communications processed by file journal interface 202 between client device 150 and server file journal 148. In some examples, server file journal 148 can track content item state and changes (e.g., revisions) as values in rows and fields in server file journal 148. For example, server file journal 148 can maintain one or more journals of revisions to content items in content storage 142. In some cases, the one or more journals can track revisions of each content item on each namespace. A row of values in a journal on server file journal 148 can identify a content item in a namespace and reflects a state of the content item in the namespace. A subsequent row in the journal corresponding to the same content item in the namespace can reflect a subsequent revision to the content item in the namespace. Thus, rows in server file journal 148 associated with a content item can identify the state of the content item and any revisions to the content item from creation to the current state.

To synchronize content item information (e.g., state, changes or revisions, etc.) with client device 150, server file journal 148 can send or receive revisions data 304 to or from file journal interface 202, which represent revisions tracked or stored in server file journal 148 for one or more content items. Revisions data 304 can include, for example, a log of content item revisions corresponding to rows in server file journal 148. Server file journal 148 can send revisions data 304 to file journal interface 202, which can translate revisions data 304 into operations data 302 for client device 150, as further described herein.

In some cases, client device 150 can perform content operations to update or modify content items at client device 150. To synchronize content item information with server file journal 148, client device 150 can send or receive operations data 302 to or from file journal interface 202. Client device 150 can send operations data 302 to file journal interface 202 to report changes at client device 150 to content items, and receive operations data 302 from file journal interface 202 to obtain the latest state of content items from server file journal 148 (e.g., revisions data 304).

Operations data 302 can include a cursor that identifies the latest state or revision obtained by client device 150 for each namespace associated with client device 150. For example, the cursor can identify the latest revision in server file journal 148 obtained by client device 150 for each namespace associated with client device 150. The information in the cursor allows file journal interface 202 to determine whether an operation in operations data 302 from client device 150 reflects the latest state or revisions in server file journal 148 for the namespace(s) associated with the operation. This can help file journal interface 202 ensure that operations in operations data 302 from client device 150 that correspond to older revisions in server file journal 148 are not written to server file journal 148, which can create a conflict between existing revisions in server file journal 148 and revisions translated from operations data 302.

To enable synchronization of content item information between client device 150 and server file journal 148, file journal interface 202 can translate (e.g., via translation service 204) operations data 302 to revisions data 304, and vice versa. When receiving operations data 302 from client device 150, file journal interface 202 can convert operations data 302 to revisions data 304, which includes content item revisions interpreted from operations in operations data 302. When receiving revisions data 304 from server file journal 148, file journal interface 202 can convert revisions data 304 to operations data 302, which include operations for implementing revisions in revisions data 304 at client device 150. Revisions data 304 includes data in server file journal 148 describing what happened to one or more content items (e.g., revisions to the one or more content items), and operations data 302 includes operations that have been executed or should be executed at client device 150 to modify the one or more content items. Thus, file journal interface 202 can translate data describing revisions to one or more content items from server file journal 148 (e.g., revisions data 304) to operations that have or should be executed at client device 150 to modify the one or more content items at client device 150.

In addition to translating operations data 302 from client device 150 to revisions data 304 for server file journal 148, file journal interface 202 can convert revisions data 304 from server file journal 148 to operations data 302 for client device 150. File journal interface 202 can obtain revisions data 304 from server file journal 148 and translate revisions in revisions data 304 to operations for execution at client device 150 to revise one or more content items at client device 150 according to such revisions. The operations generated from the revisions in revisions data 304 are included in operations data 302 provided by file journal interface 202 to client device 150. This translation between operations data 302 and revisions data 304 allows client device 150 and server file journal 148 to synchronize content item information with each other.

Prior to writing to server file journal 148 any revision data 304 generated from operations data 302 provided by client device 150, file journal interface 202 can check a cursor in operations data 302 and/or query server file journal 148 to ensure any revisions in revisions data 304 do not create a conflict in server file journal 148. For example, file journal interface 202 can query server file journal 148 to check whether the version of a content item associated with a revision in revisions data 304 is the same the version of the content item at server file journal 148, or whether the version of the content item at server file journal 148 is an updated or different version as the content item to which the revision in revisions data 304 pertains. If server file journal 148 shows that the latest version of the content item is a different version than the version to which revision data 304 pertains, the two versions are in conflict.

File journal interface 202 can update server file journal 148 to store new revisions included in revisions data 304 derived from operations data 302. In some examples, when querying and/or updating revisions in server file journal 148, file journal interface 202 can query namespace membership store 208 to retrieve namespace ownership information associated with any namespaces affected by the revisions in revisions data 304. The namespace ownership information can indicate which user account(s) own or are members of a particular namespace, and are able to access the particular namespace. Thus, file journal interface 202 can analyze the namespace ownership information to ensure server file journal 148 is not updated to include a revision to a namespace from a user account that is not a member of the namespace.

Figure 3B:
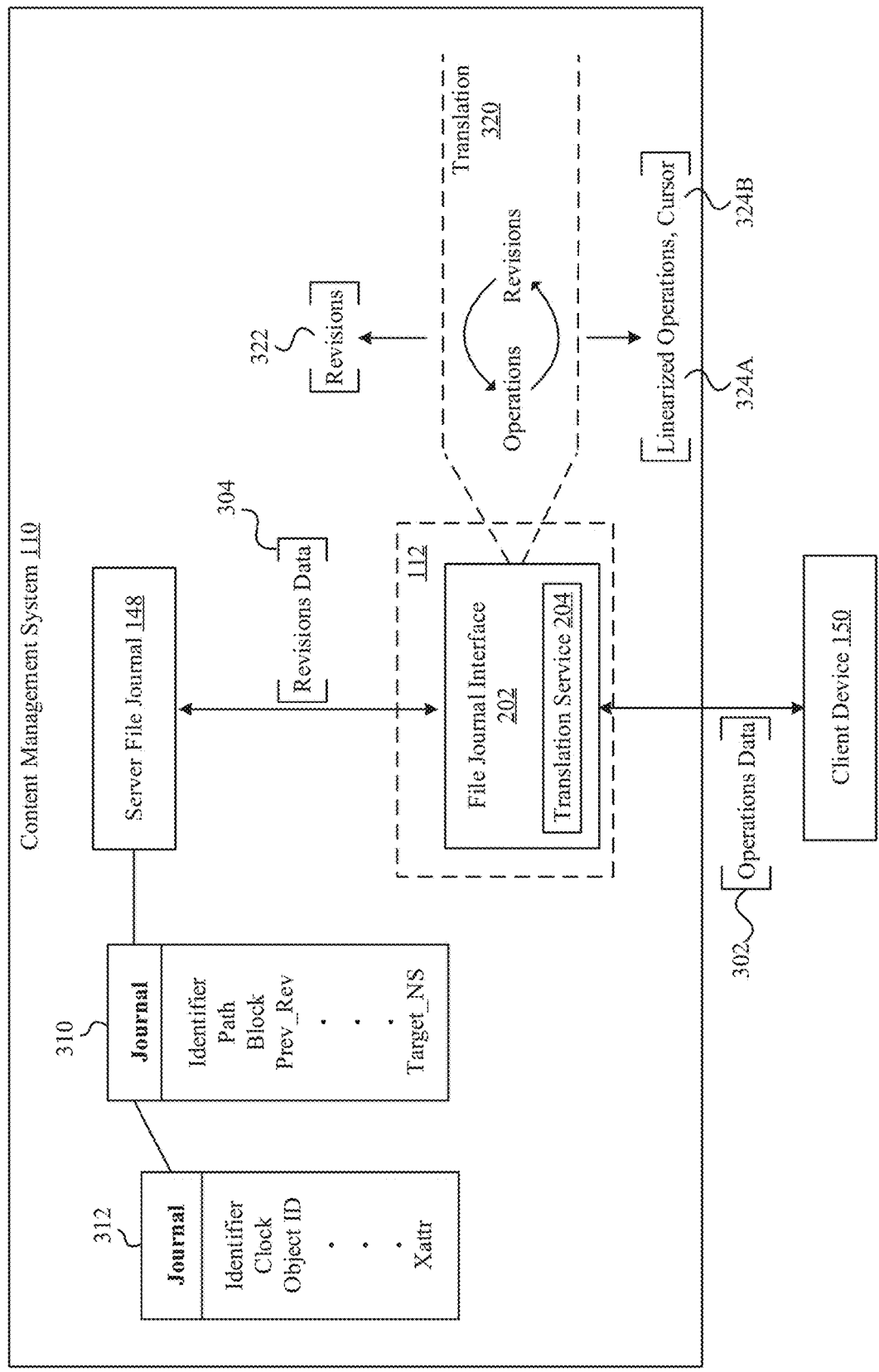
FIG. 3B is a diagram showing an example process for translating communications between a client device and a server file journal on a content management system, in accordance with some examples of the present disclosure.

With reference to FIG. 3B, server file journal 148 can store journals 310, 312 to track and identify content item revisions and state. In this example, journal 310 includes records containing a revision identifier (or state identifier), a path, a block, a previous revision (Prev_Rev), and target namespace (Target NS). In some examples, the revision identifier can provide and/or identify an ordering of operations or revisions within a namespace. In some examples, the revision identifier can include a namespace identifier (NSID), a clock (e.g., a timestamp, a lamport clock, a hybrid logical clock, etc.), a server journal identifier (SJID), an object identifier, and/or any other identifier value(s).

An NSID can include one or more values that uniquely identify a namespace in server file journal 148. In some cases, an SJID can include monotonically increasing values that map to respective rows in a given namespace and provide an ordering of operations or revisions within that namespace. In some cases, the path can be a namespace-relative path that identifies an associated content item. Prev_Rev identifies the row in server file journal 148 that corresponds to the previous state of the content item associated with the path. Target NS identifies the NSID of the target namespace for a mount point of a mounted namespace. The Target NS field is not set for rows (e.g., revisions) that do not correspond to mount points.

In this example, journal 312 includes records containing an identifier (e.g., an NSID, clock, SJID, and/or any other identifier values), an object identifier (OID), extended attribute(s) (xattr), etc. The xattr can store metadata associated with content items or operations. The example values in journal 310 and journal 312 are merely illustrative examples provided for explanation purposes. One of ordinary skill in the art will recognize that other values and/or configurations are also possible and contemplated herein. For example, in some cases, journal 310 and/or journal 312 can include other fields such as a size field which represents the size of an associated content item, a directory field (e.g., Is_Dir) which can be set to indicate when a content item is a directory, a file identifier that uniquely identifies the associated file, etc.

File journal interface 202 can perform translation 320 based on operations data 302 and revisions data 304. When performing translation 320, translation service 204 can transform operations data 302 into revisions 322 that can include linearized revisions for storage at server file journal 148. Translation service 204 can transform revisions data 304 into linearized operations 324A, included in operations data 302 sent to client device 150, which can be applied by client device 150 to update content item information (e.g., state, changes, etc.) at client device 150. Translation service 204 can also generate or update cursor 324B and provide cursor 324B in operations data 302 to client device 150. Cursor 324B identifies a respective revision or row in server file journal 148 corresponding to each namespace and/or content item associated with linearized operations 324A.

As previously explained, server file journal 148 can track the state and/or revisions of content items at content management system 110, for use in synchronizing copies of content items stored across devices. Intents store 212 can also track intended states of content items after execution of one or more associated operations that are in progress and/or have not completed. Content management system 110 can use the intended states in intents store 212 to provide, to a client device requesting access to a content item associated with an operation(s) that has not completed, the requested content item according to the intended state. The client device can then access the content item in the intended state as if the operation(s) had already completed, even if the operation(s) has not completed and/or is in progress, rather than accessing the content item in the state prior to the operation(s) and/or in an intermedia state after the operation(s) but before completion of the operation(s).

In some examples, the client device can obtain the intended state associated with an ongoing or incomplete operation on a content item at a particular period in time, which can be a current time (e.g., real time) or a time in the past. For example, the client device can request to access a content item at a period in the past when an operation on the content item was in progress. The content management system 110 can provide the intended state for that content item even if the operation has not completed at that particular point in time.

Content management system 110 can predict/project the intended state of a content item even if an operation estimated to achieve the intended state is in progress and/or has not completed. Content management system 110 can predict/project the intended state of the content item based on, for example, any dependencies, causalities, permissions, timestamps/clocks, etc., associated with the content item and/or the operation. Content management system 110 can store the intended state predicted/projected for the content item in intents store 212, for use in responding to client requests associated with the content item.

The intended state can prevent client devices from accessing the content item in the state of the content item prior to the operation and/or in an *intermedia* state after the operation is initiated but before the operation is completed, unless any of such states (e.g., the state prior to the operation and/or the intermediate state) is/are specifically requested by the client devices. This can ensure that client devices do not receive outdated/obsolete content item states, observe inconsistencies in content items associated with an in-progress or incomplete operation, experience an apparent data loss (e.g., data unexpectedly appearing to be missing during an operation, etc.), and/or experience any other unexpected/inconsistent behavior and/or state that could occur when a content item is accessed during an in-progress or incomplete operation.

Figure 4A:
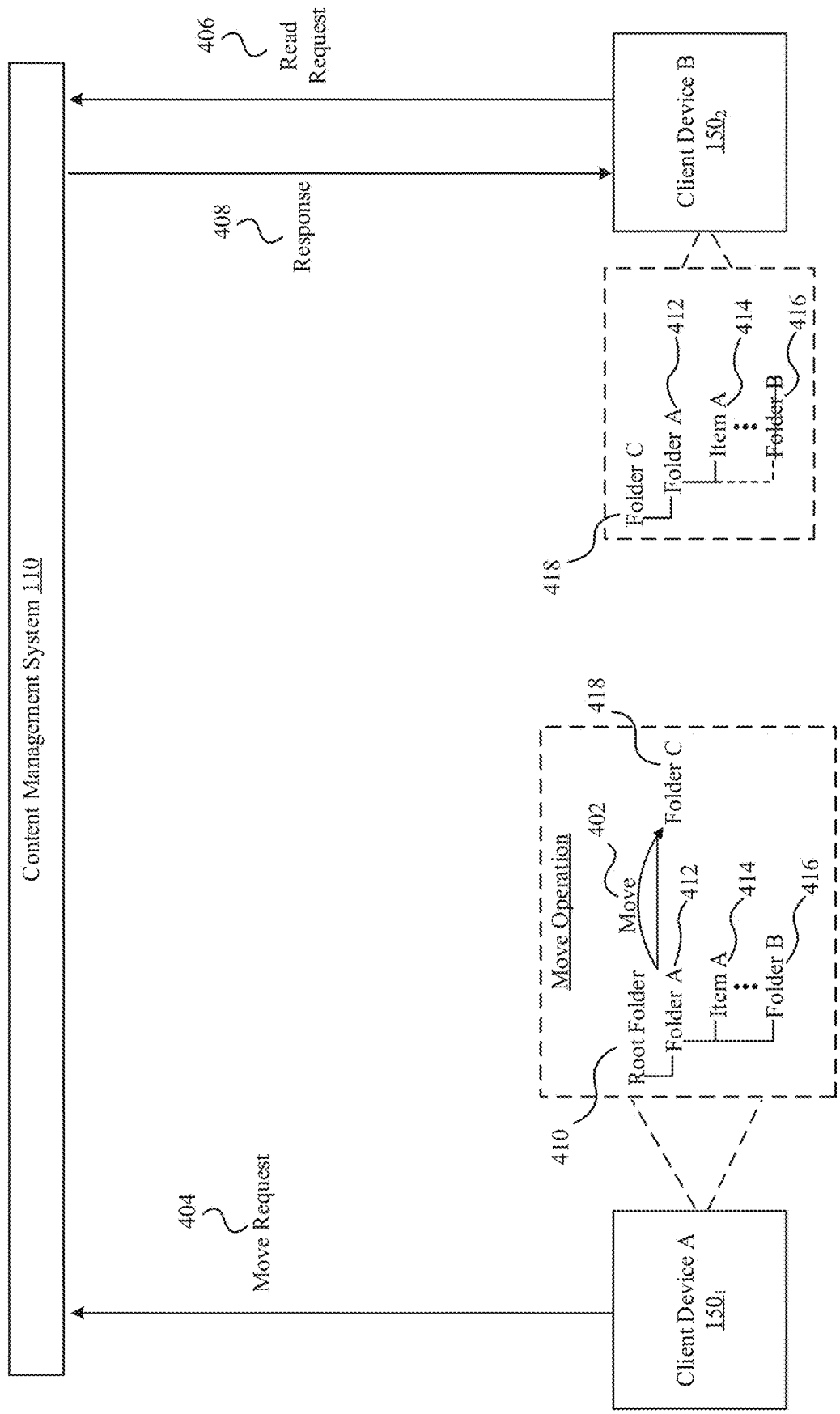
FIG. 4A is a diagram showing an example inconsistency experienced by a client device when accessing a content item according to an intermediate state associated with a content item operation, in accordance with some examples of the present disclosure.

FIG. 4A is a diagram showing an example inconsistency experienced by a client device when accessing a content item according to an intermediate state associated with a content item operation. In this example, client device $150_1$ has sent move request 404 to content management system 110. The move request 404 includes move operation 402 to move folder 412 inside of folder 418. As shown, prior to move operation 402, folder 412 is located inside of root folder 410 and, after move operation 402, folder 412 will located be inside of folder 418.

After move request 404 but prior to completion of move operation 402, client device $150_2$ has sent read request 406 to content management system 110. Read request 406 is a request to read folder 412 from client device $150_2$. Based on read request 406, content management system 110 has sent response 408 to client device $150_2$. Response 408 in this example includes an intermediate state of folder 412. The intermediate state is a state of folder 412 after move operation 402 was initiated but before move operation 402 has completed. Based on the intermediate state, folder 412 can appear to have one or more inconsistencies when client device $150_2$ reads folder 412.

To illustrate, in the example shown in FIG. 4A, before move operation 402, folder 412 includes item 414 and folder 416. However, when folder 412 is displayed at client device $150_2$ according to the intermediate state, folder 412 appears to include item 414 as before, but appears to be missing folder 416. This apparent loss of folder 416 can result from client device $150_2$ accessing folder 412 after move operation 402 has started moving contents of folder 412 to folder 418 but before move operation 402 has completed. In other words, in the intermediate state, item 414 inside of folder 412 has already been moved with folder 412 but folder 416 has not started or completed moving and thus is not displayed inside of folder 412. Such inconsistency can negatively affect the user experience of the user at client device $150_2$, and can even mistakenly lead the user to believe a partial loss of data (e.g., folder 416) has occurred.

The inconsistency and the type of operation shown in FIG. 4A are merely illustrative examples provided for explanation purposes. One of ordinary skill in the art will recognize in view of the disclosure that other inconsistencies and problems can occur, and other types of operations can cause the same and/or different inconsistencies and/or problems. For example, in some cases, depending on timing, circumstances, etc., of move operation 402, read request 406, and/or response 408, folder 412 can appear empty or can appear to be missing entirely. Other non-limiting, illustrative examples of operations that can cause inconsistencies and/or problems when presenting content items associated with such operations include delete operations, mount operations, partition operations, copy operations, edit/write operations, renaming operations, other file system operations, etc.

To avoid inconsistencies and/or problems from in-progress and/or incomplete operations, content management system 110 can predict/project what the state of a content item will be after completion of an associated operation, and provide the predicted/projected state of that content item to a requesting client so the client sees the content item according to the end state after the operation has completed. For example, with reference to FIG. 4B, when client device $150_2$ sends read request 406 to content management system 110, content management system 110 can determine the predicted/projected state of folder 412 (e.g., what the state of folder 412 will be after move operation 402), and provide the predicted-projected state in response 420 to client device $150_2$.

Figure 4B:
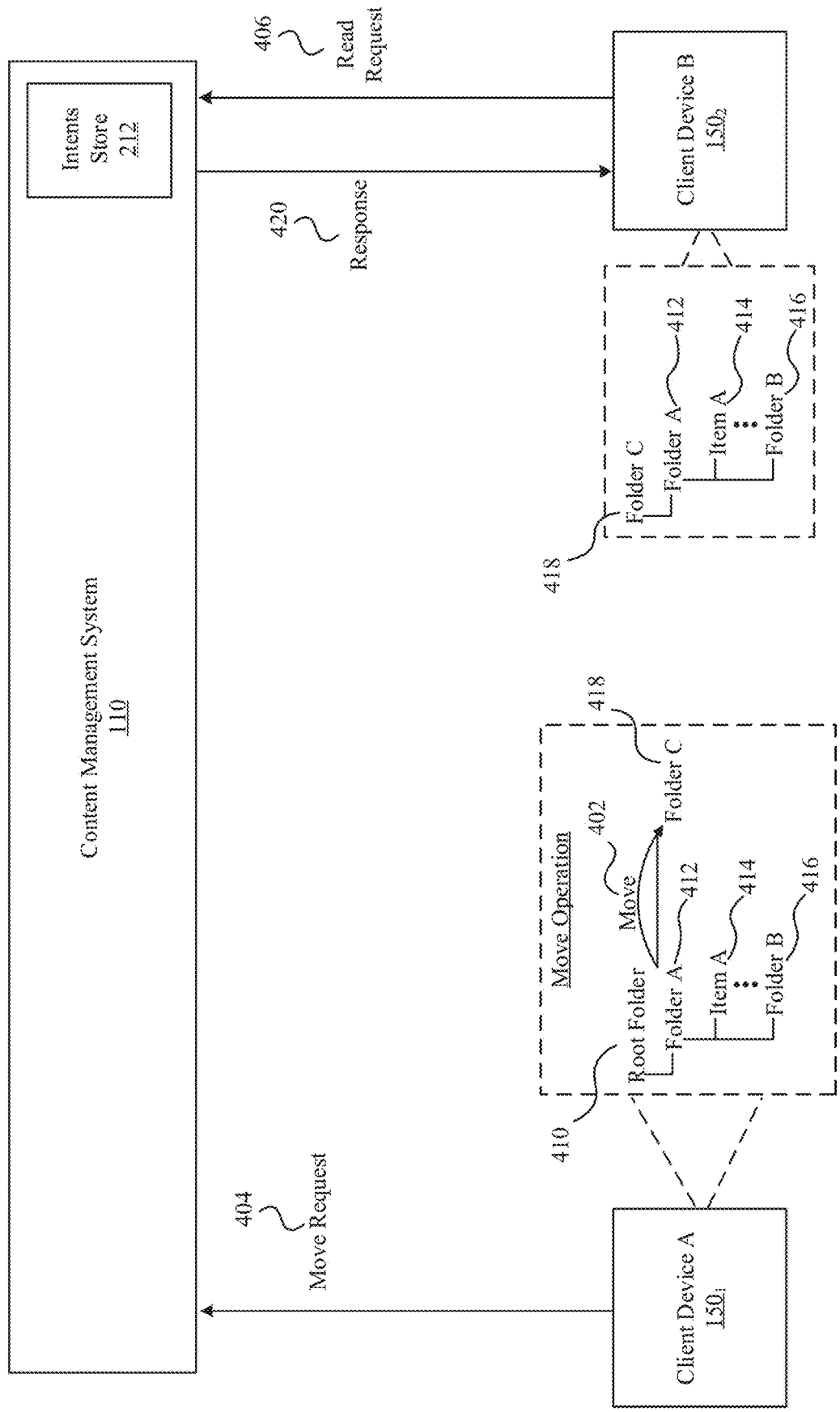
FIG. 4B is a diagram showing an example rendering of a content item accessed by a client device according to a predicted state associated with a content item operation, in accordance with some examples of the present disclosure.

As shown in FIG. 4B, the predicted/projected state of folder 412 in response 420 reflects the state of folder 412 after move operation 402, including folder 416 previously missing in the example shown in FIG. 4A. When client device 150$_2$ displays folder 412 after response 420, folder 412 will appear to be located inside of folder 418 and will appear to include all the content items it had before move operation 402 (e.g., item 414, folder 416). Thus, by providing the predicted/projected state in response 420 rather than providing the current state of folder 412 (e.g., the state of folder 412 while move operation 402 is in progress and has not completed), content management system 110 can eliminate problems and inconsistencies encountered when instead providing a state that differs from the state of folder 412 after completion of move operation 402.

In some examples, content management system 110 can store and/or obtain the predicted/projected state of folder 412 from intents store 212. In some cases, if intents store 212 does not have the predicted/projected state of folder 412, content management system 110 can calculate the predicted/projected state of folder 412 upon receiving read request 406 associated with folder 412. Content management system 110 can store the predicted/projected state in intents store 212 and include it in response 420 to client device 150$_2$.

In some examples, in addition to calculating the predicted/projected state at the destination location (e.g., folder 418), content management system 110 can calculate and/or record the state at the source location (e.g., root folder 410). The state at the source location can include the state before move operation 402. In some examples, the state at the source location can additionally or alternatively include a predicted/projected state of the source location after move operation 402. In such examples, content management system 110 can store in intents store 212 the predicted/projected state of both the source and destination locations. For example, content management system 110 can calculate the predicted/projected state of root folder 410 after move operation 402 and the predicted/projected state of folder 418 after move operation 402. Content management system 110 can then store the predicted/projected states of root folder 410 and folder 418 in intents store 212. In some cases, intents store 212 can store/track source intents, such as the state of root folder 410 in FIG. 4B, and destination intents, such as the predicted/projected state of folder 418 after move operation 402.

In some examples, prior to, and/or as part of, calculating a predicted/projected state, content management system 110 can verify permissions to ensure that client device 150$_1$ (and/or the user account associated with client device 150$_1$), has sufficient permissions to move folder 412 to folder 418, and that client device 150$_2$ (and/or the user account associated with client device 150$_2$) has sufficient permissions to access folder 412 when stored inside of folder 418. For example, if content management system 110 determines that client device 150$_1$ (and/or the user account associated with client device 150$_1$) does not have permission to perform move operation 402, content management system 110 can reject move operation 402. If content management system 110 determines that client device 150$_2$ (and/or the user account associated with client device 150$_2$) does not have sufficient permissions to access folder 412 when stored inside of folder 418 (or at all), the predicted/projected state included in response 420 may not reflect folder 412 inside of folder 418 (e.g., given the lack of access to folder 412 inside of folder 418) or inside of root folder 410 (e.g., given that folder 412 will no longer be inside of folder 418 after move operation 402).

In some examples, to calculate a predicted/projected state after a particular operation, content management system 110 can calculate each atomic operation and/or sequential operation that is performed as part of the particular operation (and/or to achieve the intended result of the particular operation). For example, in FIG. 4B, move operation 402 can involve deleting folder 412 from root folder 410 and adding folder 412 to folder 418. To calculate the predicted/projected state of folder 418 (e.g., the destination location) after move operation 402, content management system 110 can calculate the result of deleting folder 412 from root folder 410 and adding folder 412 to folder 418. The predicted/projected state of the destination location (e.g., folder 418) will reflect the addition of folder 412 to folder 418. In some examples, as part of calculating a predicted/projected state after the particular operation, content management system 110 can take into account any dependencies, causalities, affected and/or propagated permissions, etc., associated with the particular operation, the content item(s) affected by the particular operation, and/or any other relevant conditions and/or parameters.

Figure 5:
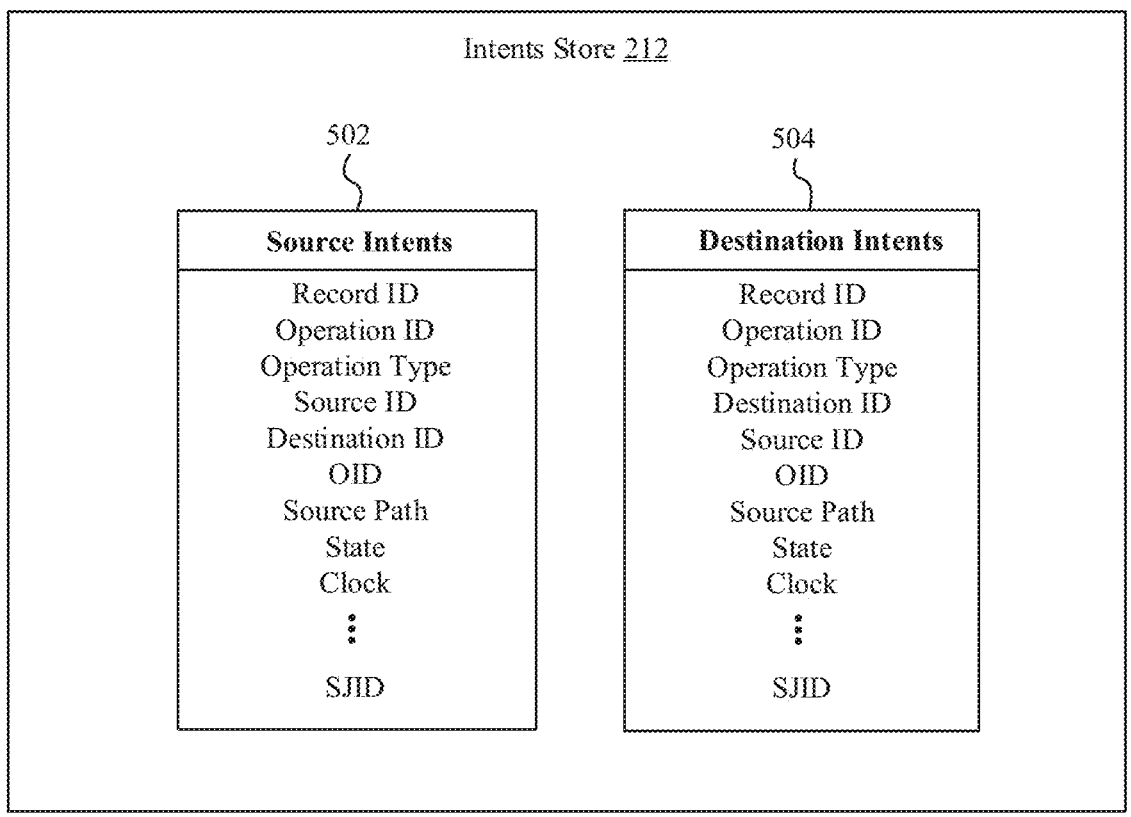
FIG. 5 is a diagram showing an example schema of an intents store for tracking intended states, in accordance with some examples of the present disclosure.

FIG. 5 is a diagram showing an example schema of intents store 212. In this example, intents store 212 includes source intents 502 and destination intents 504. Source intents 502 and destination intents 504 can include and/or represent, for example, tables, logs, databases, and/or any other data structure. Source intents 502 can store and track information related to operations, content items at the one or more source locations, and/or states at the one or more source locations. Destination intents 504 can store and track information related to operations affecting one or more destination locations, content items at the one or more destination locations, and/or predicted states of the one or more destination locations. The source location can include and/or represent, for example and without limitation, a source namespace, a source folder, a source directory, a source path, a source content item, etc. Similarly, the destination location can include and/or represent, for example and without limitation, a destination namespace, a destination folder, a destination directory, a destination path, a destination content item, etc.

In the example shown in FIG. 5, source intents 502 includes a record ID field uniquely identifying entries in source intents 502, an operation ID field for uniquely identifying an operation(s) associated with a record ID, an operation type field for data describing a type of operation(s) associated with an operation ID, a source ID field for uniquely identifying a source location, a destination ID field for uniquely identifying a destination location, an object ID (OID) field for uniquely identifying content items, a source path field for identifying source paths associated with the source location and/or content items at the source location, a state field for recording states of the source location and/or content items at the source location, a clock field for recording clock values (e.g., timestamps, lamport clocks, hybrid logical clocks, etc.), and an SJID field for SJIDs associated with rows in server file journal 148.

Destination intents 504 in this example includes a record ID field uniquely identifying entries in destination intents 504, an operation ID field for uniquely identifying an operation(s) associated with a record ID, an operation type field for data describing a type of operation(s) associated with an operation ID, a destination ID field for uniquely identifying a destination location, a source ID field for uniquely identifying a source location, an object ID (OID) field for uniquely identifying content items, a destination path field for identifying destination paths (e.g., paths associated with the destination location, content items associated with the destination location, and/or operations associated with the destination location), a predicted state field for recording predicted states based on operations associated with operation IDs, a clock field for recording clock values, and an SJID field for SJIDs associated with rows in server file journal 148.

Non-limiting examples of operations tracked and/or recorded in intents store 212 can include move operations, add operations, delete operations, mount operations, unmount operations, partition operations, purge operations, etc. In some examples, the operations can also include control operations. For example, a move can be associated with one or more move control operations that define an intent at each stage of the move. Non-limiting examples of control operations can include an outgoing operation, an incoming operation, an abort operation, a finish operation, etc. Such control operations can be processed and/or recorded to define a flow and/or state of one or more intended operations, such as an intended move operation, and/or serialize atomic operations and the processing of operations.

In some examples, destination intents 504 can host records defining intents (e.g., predicted/projected states) for requested operations such as, for example, in-progress and/or incomplete operations. For example, destination intents 504 can store incoming move records that reflect intents for in-progress and/or incomplete moves on a destination namespace, and/or source intents 502 can store outgoing move records that reflect intents for moves on a source namespace. In some examples, source intents 502 can host records defining intents (e.g., predicted/projected states, states prior to operations, etc.). In some cases, the records of intents in source intents 502 can include states prior to execution of requested operations. In some cases, the records of intents in source intents 502 can additionally or alternatively include predicted/projected states associated with requested operations such as, for example, in-progress and/or incomplete operations.

In some examples, the clocks defined in the clocks fields in source intents 502 and/or destination intents 504 can be used to determine whether the state provided to a client device should be the state before or after an operation. For example, a timestamp in a clocks field can identify a time associated with an intent and/or operation (e.g., a time when an intent was calculated/recorded, a time when an operation associated with an intent was requested/initiated, etc.). The timestamp can be used to determine whether the state provided to a client device should be a state of the source location before an operation that modifies the state of the source location, or a predicted/projected state of the destination location after the operation is completed. In some examples, the state of the source location before an operation that modifies the state of the source location can be recorded/tracked in source intents 502, and a predicted/projected state of the destination location after the operation is completed can be recorded/tracked in destination intents 504.

As previously noted, content management system 110 can use source intents 502 and destination intents 504 in intents store 212 to provide a client device access to a content item according to what the state of the content item is predicted/projected to be after a completion of one or more in-progress and/or incomplete operations that will affect a state of the content item and/or one or more content items associated with the content item such as, for example, a parent, child or otherwise related folder, namespace, directory, object, etc.

For example, when a client device requests to do an operation, the content management system 110 can validate whether this operation is possible or permitted (e.g., whether the client device has the rights/permissions needed for completion of the operation). Once content management system 110 verifies that the operation is possible/permitted, content management system 110 can write intents in intents store 212 that indicate that the operation will execute as of a timestamp corresponding to a time when the intents are written to intents store 212 and/or when the operation was validated.

In some examples, content management system 110 can write a source intent in source intents 502 and a destination intent in destination intents 504. In some cases, the source intent can correspond and/or be mapped to a source location involved and/or affected by the operation, such as a source namespace, and the destination intent can correspond and/or be mapped to a destination location involved in and/or affected by the operation, such as a destination namespace. The destination location can be the same as or different than the source location. Source intents 502 and destination intents 504 can include information that enables content management system 110 to determine the name of the content item(s) associated with the operation, any parts (and/or the entire part) of the content item that is involved in and/or affected by the operation, the name of the content item(s) at the source location and the name of the content item(s) at the destination, and/or any other data for determining the content items involved in and/or affected by the operation and states before and after the operation.

When another client device attempts to access the content item (e.g., when that client device attempts to perform a read), content management system 110 can receive an access request from that client with information indicating what content item and/or part of a content item that client device is attempting to access. For example, the request can indicate the name of the requested content item and the namespace of the content item. Content management system 110 can use such information to perform a lookup in intents store 212 and determine that there is an intent associated with an operation on the content item. Content management system 110 can obtain the source intent and destination intent from source intents 502 and destination intents 540, respectively, and a timestamp at which such intent was written in intents store 212.

Content management system 110 can use the timestamp to determine whether the state returned to the requesting client device should be according to the state at the source location (e.g., the state in source intents 502) before execution of the operation or the state at the destination location (e.g., the predicted/projected state in destination intents 504). For example, if the client device's request has a timestamp that is earlier than the timestamp associated with the operation and recorded in intents store 212, content management system 110 can determine that the state provided in the response to the client device should be based on the state at source intents 502, which can describe the state of the content item before the operation. If the client device's request has a timestamp that is later than the timestamp associated with the operation and recorded in intents store 212, content management system 110 can determine that the state provided in the response to the client device should be based on the state at destination intents 504, which can describe the predicted/projected state of the content item after the operation completes.

In some examples, if content management system 110 determines that the state in the response to the client device should be the predicted/projected state describing the state of the content item after completion of the operation, content management system 110 can retrieve the source state from source intents 502 and modify the source state according to what the state is predicted/projected to be after the operation. For example, if the operation is a move of the content item from namespace 1 to namespace 2 and the timestamp of the client device's request is after the timestamp recorded for the operation in intents store 212, content management system 110 can retrieve from source intents 502 the state of namespace 1 including the state of the content item in namespace 1, and modify that state according to the state that is predicted/projected for namespace 2 and the content item in namespace 2 when the move completes. When the client device receives the response from content management system 110, the received state can ensure that the content item is stored in (and/or appears to be stored in) namespace 2, even if the move from namespace 1 to namespace 2 is in progress and/or has not completed.

In some examples, if an intent in intents store 212 corresponds to an operation to move a content item to a destination that a particular user account does not have access/permissions to (also referred to as a "move-out operation"), content management system 110 can determine that the user account will not have access to that content item after the operation completes. Content management system 110 can then include in the response to the client device associated with that user account a state that reflects the user account's lack of access to the content item in the destination. For example, content management system 110 can provide a state that hides the content item from the user account or otherwise prevents the user account from accessing the content item. In some examples, the user account will no longer have access and/or visibility to the content item at the source or destination locations.

In some cases, with certain types of operations, such as mount operations and sharing/partition operations, content management system 110 may create and register an identifier (e.g., an OID) for a resulting object ahead of time (e.g., before that object is created and/or configured). To illustrate, in some examples, if an intent in intents store 212 corresponds to a partition operation such as a share operation, content management system 110 can proactively or preemptively allocate an identifier, such as an OID, to a new namespace that will be created as part of the partition operation, and include the identifier and state of the new namespace in the response to a requesting client device. For example, when performing a partition operation corresponding to a share, content management system 110 may create and allocate a new namespace, delete the contents at a source namespace, add the contents to the new destination namespace, and mount the new namespace in the original location associated with the source namespace. In some cases, content management system 110 can hide all of this state from client devices.

Moreover, after verifying permissions and before committing the partition and writing an intent to intents store 212 indicating that the namespace associated with the partition operation is going to be shared, content management system 110 can allocate an OID to the new namespace even before the new namespace is created and/or an identifier would have otherwise been created for the new namespace. Having allocated an OID to the new namespace ahead of time, content management system 110 can include the OID in a response to a requesting client as well as the new namespace that will result from the partition operation.

As another example, when a mount operation is requested, in some cases, content management system 110 can record in intents store 212 a mount intent indicating that a new namespace will be mounted based on the mount operation. Content management system 110 can then determine what the new namespace associated with the mount operation will be and, when responding to a requesting client device, can include a state that includes the new namespace. Based on the received state, the new namespace will appear at the client device as if that new namespace has already been mounted for a user account associated with the client device.

Certain operations, such as moves for example, can affect and/or propagate permission changes in some parts of a user account's directory structure. Thus, in some cases, when determining a predicted/projected state associated with such operations, content management system 110 may predict what the permissions are going to be after completion of such operations. For example, content management system 110 may traverse one or more parts of the user account's directory structure and predict permission changes associated with such operations. Content management system 110 can use the predicted permissions when determine how and/or what state to return to a requesting client device associated with that user account.

It should be noted that a destination location, such as a destination namespace, can refer to the same or different location as the source location, such as the same or different namespace as a source namespace. For example, in some cases, a move may involve moving one or more content items from one location or path on a namespace to a different location or path within the same namespace. In this example, the destination namespace would be the same as the source namespace. In other cases, a move may involve moving one or more content items across namespaces. When the move is across namespaces (e.g., a cross-namespace move), the destination namespace will be different than the source namespace.

The fields shown in source intents 502 and destination intents 504 are merely illustrative examples provided for explanation purposes. In other examples, the fields in source intents 502 and destination intents 504 can include more or less fields than shown in FIG. 5. Moreover, in other examples, the fields in source intents 502 and destination intents 504 can include one or more of the same and/or different fields as the fields shown in FIG. 5.

As previously explained, in some cases, to determine a predicted/projected state after an operation(s), content management system 110 may calculate a state of a sequence of atomic operations associated with the operation(s). Content management system 110 can determine the predicted/projected state after the operation(s) based at least in part on the state of the sequence of atomic operations. In some examples, content management system 110 can use time information, such as clocks, to calculate the state of the sequence of atomic operations and the operation(s).

Figure 6:
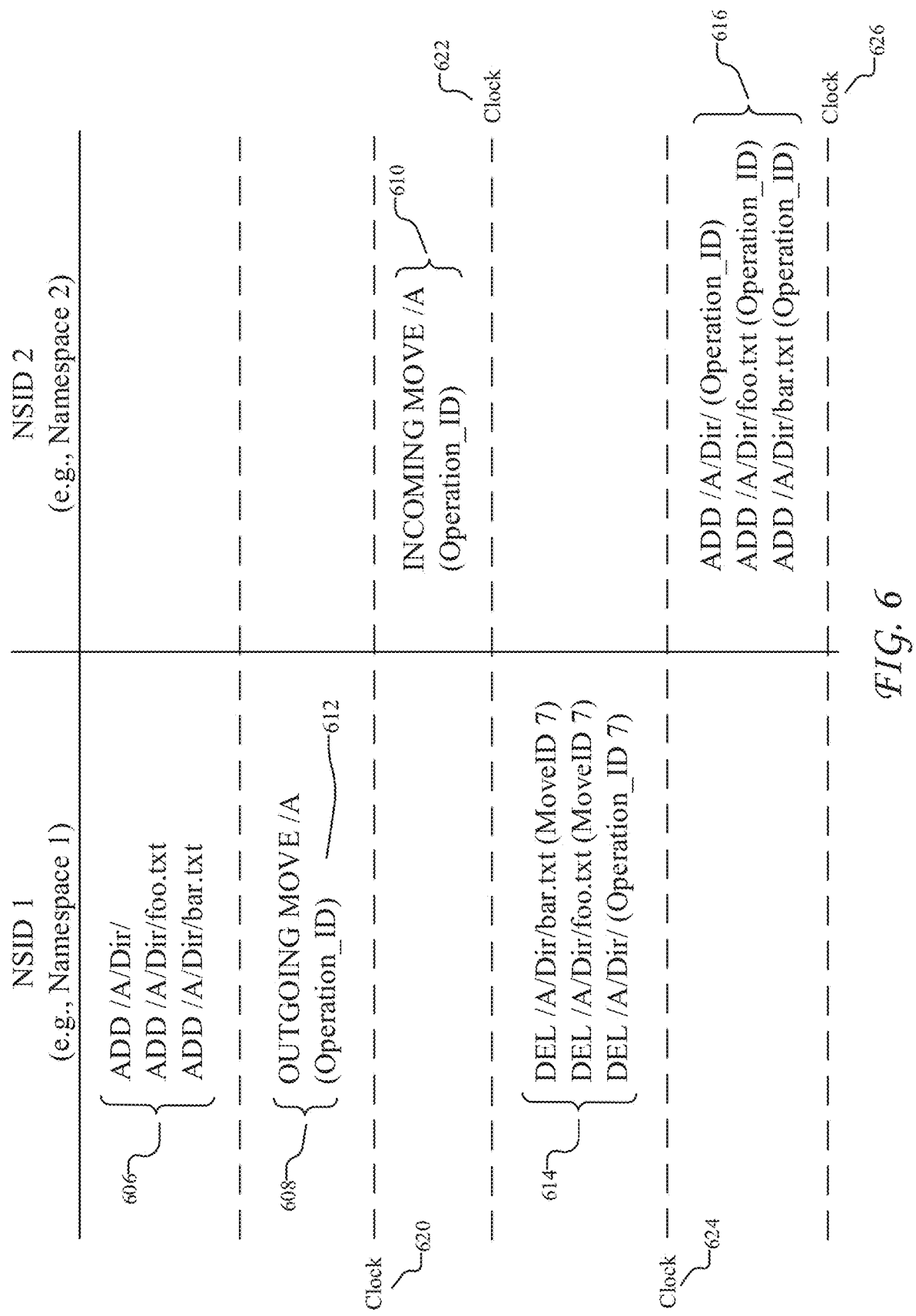
FIG. 6 is a diagram showing an example sequence for processing operations with clocks, in accordance with some examples of the present disclosure.

FIG. 6 is a diagram showing an example sequence for processing operations with clocks. In some examples, the clocks can include logical clocks, such as lamport clocks. In other examples, the clocks can include hybrid logical clocks (HLCs). HLCs can include a combination of physical time (e.g., physical clocks) and logical clocks.

In FIG. 6, the operations include a cross-namespace move from NSID 1 (namespace 1) to NSID 2 (namespace 2). The various operations for the move are processed and serialized for NSID 1 and NSID 2 until the move is complete at both namespaces, which will reflect the end state after the move.

Content management system 110 can calculate the end state when predicting/projecting a state after the move.

In this example, before the move, content management system 110 has performed add operations 606 at NSID 1. Add operations 606 add "/A/Dir/", "/A/Dir/foo.txt", and "/A/Dir/bar.txt" to NSID 1. Here, "Dir" represents a subdirectory within directory "A", and files "foo.txt" and "bar.txt" are added within subdirectory "Dir".

After add operations 606, content management system 110 detects a move operation for moving directory "/A/" from NSID 1 to NSID 2. Content management system 110 can record outgoing move operation 608 for NSID 1 at source intents 502. In this case, NSID 1 is the source namespace for the move operation of directory "/A/" at NSID 1. When processing outgoing move operation 608, content management system 110 can assign operation identifier 612 to the move of "/A/" from NSID 1 to NSID 2. Content management system 110 can record information associated with the outgoing move at source intents 502. For example, content management system 110 can record operation identifier 612, NSID 1 as the source namespace, NSID 2 as the destination namespace, the source path at NSID 1, a state of NSID 1 prior to the move, clock 620 for outgoing move operation 608, and/or any other information associated with outgoing move operation 608. In some cases, content management system 110 can also record a state of the move (e.g., in progress) and/or define a cursor based on outgoing move operation 608.

Next, content management system 110 can determine incoming move operation 610 for NSID 2 at destination intents 504. Incoming move operation 610 corresponds to the incoming move of directory "/A/" at NSID 2. In some examples, content management system 110 can record and/or associate incoming move operation 610 with operation identifier 612 to correlate incoming move operation 610 at NSID 2 to the move associated with outgoing move operation 608 at NSID 1. In some cases, content management system 110 can increment clock 620 to determine clock 622 associated with incoming move operation 610. In some examples, content management system can record clock 622 in destination intents 504. In some cases, content management system can additionally or alternatively record clock 620 in destination intents 504.

Content management system 110 can then determine delete operations 614 at NSID 1, which delete "/A/Dir/", "/A/Dir/foo.txt", and "/A/Dir/bar.txt" from NSID 1. Content management system 110 can associate delete operations 614 with operation identifier 612 to correlate delete operations 614 with the move of directory "/A/" from NSID 1 to NSID 2 associated with outgoing move operation 608.

Content management system 110 can increment clock 622 for delete operations 614 at NSID 1 to determine clock 624. The state of NSID 1 after delete operations 614 can reflect the end state of NSID 1. In some examples, content management system 110 can record the end state of NSID 1 at source intents 502. For example, content management system 110 can record the end state of NSID 1 in addition to, or instead of, the state of NSID 1 prior to the move.

Content management system 110 can calculate add operations 616 at NSID 2, which add "/A/Dir/", "/A/Dir/foo.txt", and "/A/Dir/bar.txt" to NSID 2. Content management system 110 can correlate add operations 616 to operation identifier 612 to associate add operations 616 with the move associated with incoming move operation 610. In some cases, content management system 110 can also tag the adds with an attribute (e.g., xattr) identifying operation identifier 612.

Content management system 110 can increment clock 624 to determine clock 626 associated with an end state of NSID 2 after the move. In some cases, content management system 110 can record (e.g., at destination intents 504) clock 626.

The state of NSID 2 after add operations 616 can reflect the predicted/projected state of NSID 2 after the move. Content management system 110 can record the predicted/projected state of NSID 2 at destination intents 504. When a client device requests access to NSID 2 (and/or to "/A", "/A/Dir/", "/A/Dir/foo.txt", and/or "/A/Dir/bar.txt") at a time after clock 620 (or at a same time as clock 620), content management system 110 can provide the predicted/projected state of NSID 2 in destination intents 504 to the client device. On the other hand, when a client device requests access to NSID 1 (and/or to "/A", "/A/Dir/", "/A/Dir/foo.txt", and/or "/A/Dir/bar.txt") at a time before clock 620 (or at a same time as clock 620), content management system 110 can provide the state of NSID 1 in source intents 502 to the client device. The state of NSID 1 in source intents 502 provided to the client device can reflect the state of NSID 1 prior to the move.

As illustrated in this example, when calculating the end state after the move, content management system 110 can process atomic operations sequentially, including delete operations 614 at NSID 1 followed by add operations 616 at NSID 2 in this example.

Figure 7:
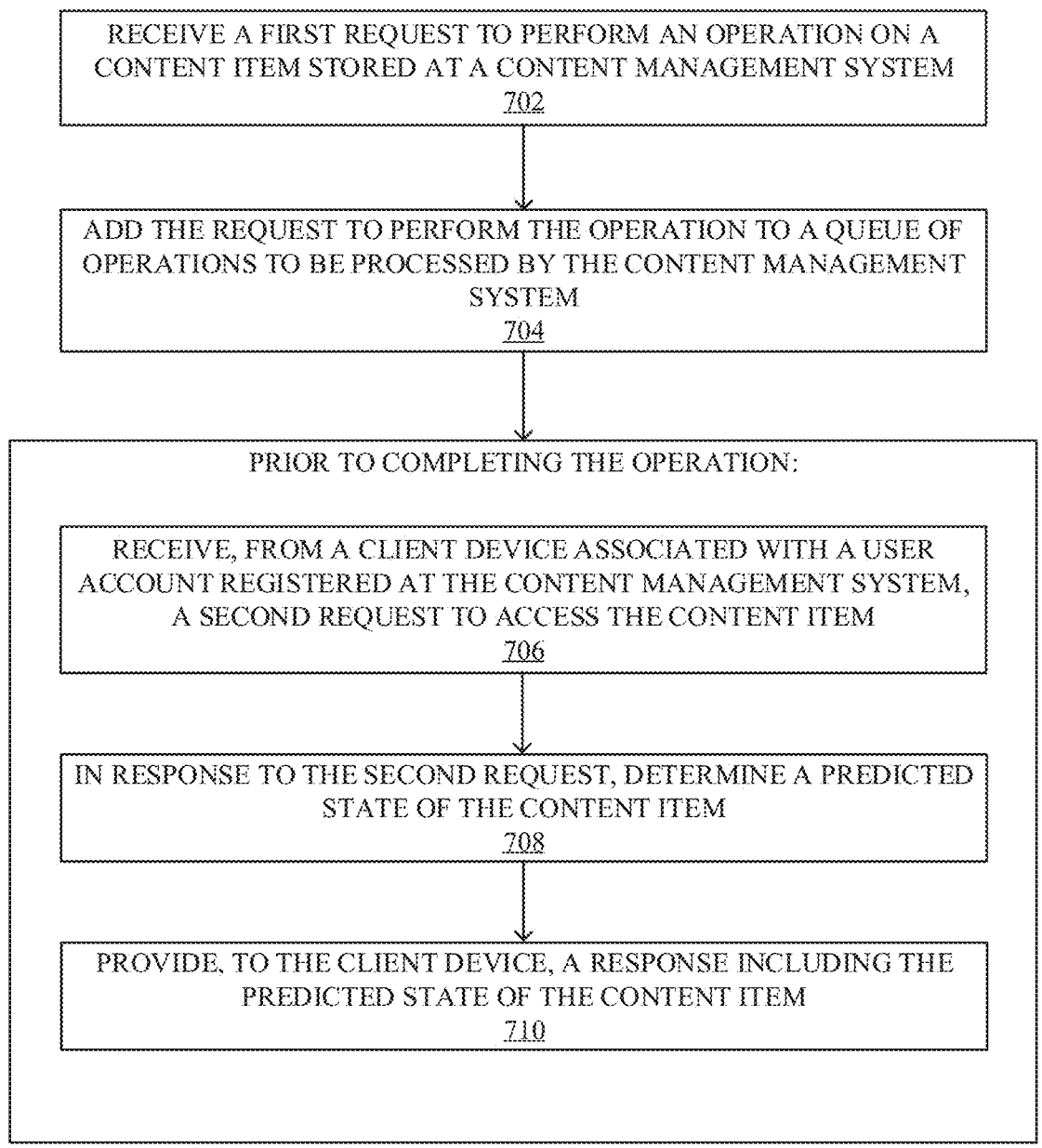
FIG. 7 is a flowchart showing an example method for tracking intents for asynchronous operations, in accordance with some examples of the present disclosure.

FIG. 7 is a flowchart showing an example method 700 for tracking intents for asynchronous operations. At block 702, the method 700 can include receiving, at content management system 110, a first request to perform an operation on a content item stored on content management system 110. The operation can include, for example and without limitation, a move operation, a mount operation, a share operation, a delete operation, an add operation, a partition operation, a copy operation, and/or any other type of content operation.

At block 704, the method 700 can include adding the request to perform the operation to a queue of operations to be processed by content management system 110.

At block 706, the method 700 can include, prior to completing the operation, receiving, from a client device (e.g., client device 150) associated with a user account registered at content management system 110, a second request to access the content item. The second request to access the content item can be, for example and without limitation, a read request, a copy request, an edit request, and/or any filesystem and/or content item request.

At block 708, the method 700 can include, prior to completing the operation, determining, in response to the second request, a predicted state (e.g., predicted/projected state) of the content item. In some examples, the predicted state of the content item can reflect a result of performing the operation on the content item. For example, in some cases, the predicted state can provide a snapshot of the content item after the operation is performed. In some cases, the predicted state can provide a snapshot of the content item and one or more other content items (e.g., a parent content item, a child content item, a related content item, a dependent and/or interdependent content item, etc.) after the operation is performed.

At block 710, the method 700 can include, prior to completing the operation, providing, to the client device, a response including the predicted state of the content item. The client device can use the predicted state of the content item to render the content item and/or any other content items affected by the operation according to the predicted state. In some examples, the predicted state can cause the content item, a parent content item of the content item, a child content item of the content item, and/or a related content item to appear, while the operation is in progress and/or incomplete, as if the operation has been performed (e.g., as if the operation has been completed).

In some examples, determining the predicted state of the content item can include determining a state of the content item corresponding to a time before the first request and/or the operation; determining the result/outcome of performing the operation on the content item; and modifying the state of the content item to reflect the result/outcome of performing the operation on the content item. In some cases, the state can also reflect the state of other content items affected by the operation.

In some examples, the method 700 can include storing the state of the content item in a first table (e.g., source intents 502) corresponding to a source namespace where the content item is located prior to the operation, and storing the predicted state of the content item in a second table (e.g., destination intents 504) corresponding to a destination namespace where the content item is predicted to be located after the operation is performed on the content item.

In some examples, the operation can include a set of atomic operations. In some cases, determining the predicted state of the content item can include determining one or more interdependencies of the set of atomic operations, and sequentially computing a result of performing the set of atomic operations according to the one or more interdependencies. In some cases, content management system 110 can use clocks and/or dependency data to sequentially compute the set of atomic operations.

In some cases, the operation can include a move operation and determining the predicted state of the content item can include determining a first state of a source location of the content item and determining a second state of a destination location of the content item. In some examples, the first state of the source location can correspond to a time before the first request is processed and/or the operation is performed, and the second state can include the predicted state of the content item after the operation is performed.

In some examples, the method 700 can include retrieving the first state of the source location from a first table (e.g., source intents 502) of state data of the source location; based on the first state and the operation, determining the second state of the destination location; updating, based on the second state, a second table (e.g., destination intents 504) of state data of the destination location to include the predicted state; and providing the predicted state to the client device. In some examples, the predicted state can cause the content item to appear to be located at the destination location while the move is in progress and/or even though the move has not been executed and/or completed.

In some cases, determining the first state can include determining a first predicted result of deleting the content item from the source location, and determining the second state can include determining a second predicted result of adding the content item to the destination location. In some examples, the first state can be based on the first predicted result and the second state can be based on the second predicted result.

In some cases, the operation can include a namespace operation. The namespace operation can include and/or represent mounting a new namespace for the user account and/or a partitioning (e.g., sharing) the content item to create the new namespace. In some examples, determining the predicted state of the content item can include verifying that the user account has permissions that allow the user account to access the new namespace associated with the namespace operation (and/or perform the namespace operation); prior to generating the new namespace, pre-allocating a namespace identifier to the new namespace; computing the predicted state for the new namespace; and providing, in the response to the client device, the predicted state for the new namespace. In some cases, the predicted state can include the pre-allocated namespace identifier and a namespace state of the new namespace.

In some cases, a client device can send the first and/or second request to content management system 110 and receive the response from content management system 110 via a web browser. In other cases, a client device can communicate with content management system 110 (e.g., can send the first and/or second request and receive the response) via an API.

Figure 8:
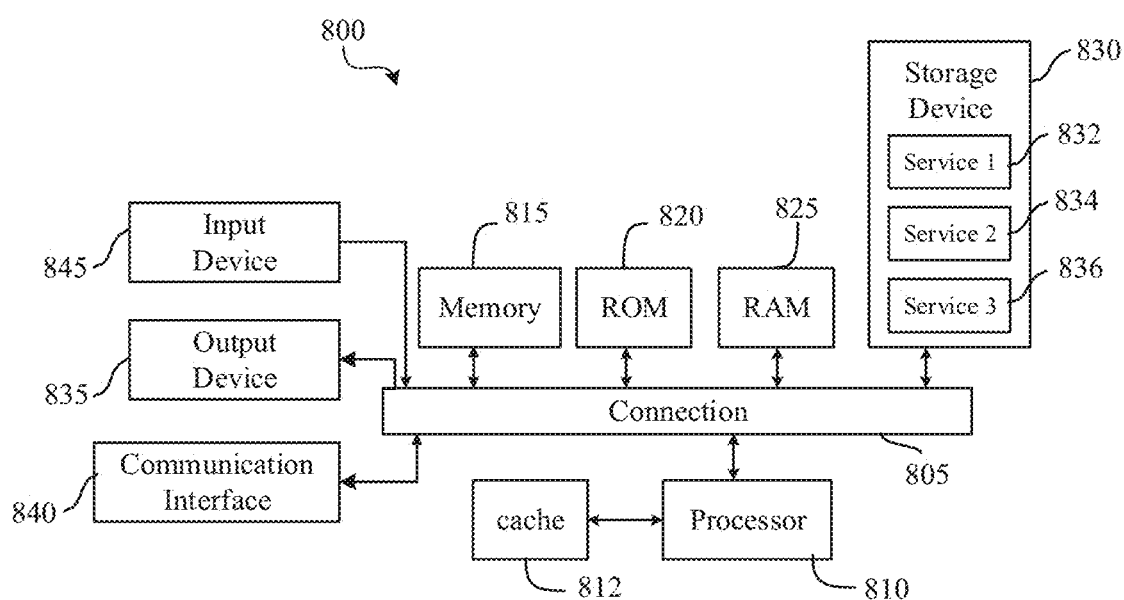
FIG. 8 is a diagram showing an example of a system architecture for implementing various aspects of the present technology.

FIG. 8 is a diagram showing an example computing device architecture 800 of an example computing device which can implement various techniques described herein. For example, the computing device architecture 800 can implement at least some portions of content management system 110 and/or client device 150 shown in FIG. 1, and perform the operations and techniques described herein. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics.

The processor 810 can include any general purpose processor and a hardware or software service, such as service (1) 832, service (2) 834, and service (3) 836 stored in storage device 830, configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device. In some instances, multimodal computing devices can enable a user to provide multiple types of input to communicate with the computing device architecture 800. The communication interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include services 832, 834, 836 for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, and source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the subject matter of this application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Claim language or other language (e.g., language in any other parts of the disclosure) reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A method comprising: receiving, at a content management system, a first request to perform an operation on a content item stored at the content management system; adding the request to perform the operation to a queue of operations to be processed by the content management system; and prior to completing the operation: receiving, from a client device associated with a user account registered at the content management system, a second request to access the content item; in response to the second request, determining a predicted state of the content item, the predicted state of the content item reflecting a result of performing the operation on the content item; and providing, to the client device, a response including the predicted state of the content item.

Aspect 2: The method of Aspect 1, wherein the predicted state causes at least one of the content item, a parent content item associated with the content item, and a child content item of the content item to appear, while the operation is in progress, as if the operation has been performed.

Aspect 3: The method of any of Aspects 1 to 2, wherein determining the predicted state of the content item comprises: determining a state of the content item corresponding to a time before at least one of the first request and the operation; determining the result of performing the operation on the content item; and modifying the state of the content item to reflect the result of performing the operation on the content item.

Aspect 4: The method of Aspect 3, further comprising: storing the state of the content item in a first table corresponding to a source namespace where the content item is located prior to the operation; and storing the predicted state of the content item in a second table corresponding to a destination namespace where the content item is predicted to be located after the operation is performed on the content item.

Aspect 5: The method of any of Aspects 1 to 4, wherein the operation comprises a set of atomic operations, and wherein determining the predicted state of the content item comprises: determining one or more interdependencies of the set of atomic operations; and sequentially computing a result of performing the set of atomic operations according to the one or more interdependencies.

Aspect 6: The method of any of Aspects 1 to 5, wherein the operation comprises a move operation, and wherein determining the predicted state of the content item comprises: determining a first state of a source location of the content item, the first state of the source location corresponding to a time before at least one of the first request is processed and the operation is performed; and determining a second state of a destination location of the content item, the second state comprising the predicted state of the content item after the operation is performed.

Aspect 7: The method of Aspect 6, further comprising: retrieving the first state of the source location from a first table of state data of the source location; based on the first state and the operation, determining the second state of the destination location; updating, based on the second state, a second table of state data of the destination location to include the predicted state; and providing the predicted state to the client device, the predicted state causing the content item to appear at the destination location while the move is in progress.

Aspect 8: The method of Aspect 6, wherein determining the first state comprises determining a first predicted result of deleting the content item from the source location, wherein determining the second state comprises determining a second predicted result of adding the content item to the destination location, wherein the first state is based on the first predicted result and the second state is based on the second predicted result.

Aspect 9: The method of any of Aspects 1 to 8, wherein the operation comprises a namespace operation, wherein the namespace operation comprises at least one of mounting a new namespace for the user account and a partitioning the content item to create the new namespace, and wherein determining the predicted state of the content item comprises: verifying that the user account has permissions that allow the user account to access the new namespace associated with the namespace operation; prior to generating the new namespace, pre-allocating a namespace identifier to the new namespace; computing the predicted state for the new namespace; and providing, in the response to the client device, the predicted state for the new namespace, the predicted state comprising the namespace identifier and a namespace state of the new namespace.

Aspect 10: A content management system comprising: one or more processors; and at least one non-transitory computer readable medium having stored thereon instructions that, when executed by the one or more processors, cause the content management system to: receive a first request to perform an operation on a content item stored at the content management system; and prior to completing the operation: receive, from a client device associated with a user account registered at the content management system, a second request to access the content item; in response to the second request, determine a predicted state of the content item, the predicted state of the content item reflecting a result of performing the operation on the content item; and provide, to the client device, a response including the predicted state of the content item.

Aspect 11: The content management system of Aspect 10, wherein the predicted state causes at least one of the content item, a parent content item associated with the content item, and a child content item of the content item to appear, while the operation is in progress, as if the operation has been performed.

Aspect 12: The content management system of any of Aspects 10 to 11, wherein determining the predicted state of the content item comprises: determining a state of the content item corresponding to a time before at least one of the first request and the operation; determining the result of performing the operation on the content item; and modifying the state of the content item to reflect the result of performing the operation on the content item.

Aspect 13: The content management system of Aspect 12, storing instructions that, when executed by the one or more processors, cause the content management system to: store the state of the content item in a first table corresponding to a source namespace where the content item is located prior to the operation; and store the predicted state of the content item in a second table corresponding to a destination namespace where the content item is predicted to be located after the operation is performed on the content item.

Aspect 14: The content management system of any of Aspects 10 to 13, wherein the operation comprises a set of atomic operations, and wherein determining the predicted state of the content item comprises: determining one or more interdependencies of the set of atomic operations; and sequentially computing a result of performing the set of atomic operations according to the one or more interdependencies.

Aspect 15: The content management system of any of Aspects 10 to 14, wherein the operation comprises a move operation, and wherein determining the predicted state of the content item comprises: determining a first state of a source location of the content item, the first state of the source location corresponding to a time before at least one of the first request is processed and the operation is performed; and determining a second state of a destination location of the content item, the second state comprising the predicted state of the content item after the operation is performed.

Aspect 16: The content management system of Aspect 15, storing instructions that, when executed by the one or more processors, cause the content management system to: retrieve the first state of the source location from a first table of state data of the source location; based on the first state and the operation, determine the second state of the destination location; update, based on the second state, a second table of state data of the destination location to include the predicted state; and provide the predicted state to the client device, the predicted state causing the content item to appear at the destination location while the move is in progress.

Aspect 17: The content management system of Aspect 15, wherein determining the first state comprises determining a first predicted result of deleting the content item from the source location, wherein determining the second state comprises determining a second predicted result of adding the content item to the destination location, wherein the first state is based on the first predicted result and the second state is based on the second predicted result.

Aspect 18: The content management system of any of Aspects 10 to 17, wherein the operation comprises a namespace operation, wherein the namespace operation comprises at least one of mounting a new namespace for the user account and a partitioning the content item to create the new namespace, and wherein determining the predicted state of the content item comprises: verifying that the user account has permissions that allow the user account to access the new namespace associated with the namespace operation; prior to generating the new namespace, pre-allocating a namespace identifier to the new namespace; computing the predicted state for the new namespace; and providing, in the response to the client device, the predicted state for the new namespace, the predicted state comprising the namespace identifier and a namespace state of the new namespace.

Aspect 19: A non-transitory computer-readable medium comprising instructions that, when executed by one or more processors, cause a content management system to perform a method according to any of Aspects 1 to 9.

Aspect 20: A content management system comprising means for performing a method according to any of Aspects 1 to 9.

What is claimed is:

1. A method comprising:
receiving, from a client device associated with a user account registered at a content management system, a request to access a content item stored at the content management system, the request being received prior to completing or performing an operation on the content item that was initiated before the request;
in response to the request to access the content item, determining a predicted state of the content item, the predicted state of the content item reflecting a result of performing the operation on the content item; and
providing a response to the request to access the content item while the operation is in progress, the response including the predicted state of the content item that causes at least one of the content item, a parent content item associated with the content item, or a child content item of the content item to appear, as if the operation has been completed.

2. The method of claim 1, further comprising:
receiving, from a different client device, a request to perform the operation on the content item, the request to perform the operation being received prior to the request to access the content item; and
adding the operation to a queue of operations at the content management system.

3. The method of claim 1, wherein determining the predicted state of the content item comprises:
determining a state of the content item corresponding to a time before the operation;
determining the result of performing the operation on the content item; and
based on the result of performing the operation on the content item, determining the predicted state of the content item.

4. The method of claim 3, wherein providing the response to the request to access the content item comprises:
modifying the state of the content item to reflect the predicted state of the content item; and
providing the content item according to the predicted state.

5. The method of claim 3, further comprising:
storing the state of the content item in a first table corresponding to a source namespace where the content item is located prior to the operation; and
storing the predicted state of the content item in a second table corresponding to a destination namespace where the content item is predicted to be located after the operation is performed on the content item.

6. The method of claim 1, wherein the operation comprises a set of atomic operations, and wherein determining the predicted state of the content item comprises:
determining one or more interdependencies of the set of atomic operations; and
sequentially computing a result of performing the set of atomic operations according to the one or more interdependencies.

7. The method of claim 1, wherein the operation comprises a move operation, and wherein determining the predicted state of the content item comprises:
determining a first state of a source location of the content item, the first state of the source location corresponding to a time before the operation was initiated or completed; and
determining a second state of a destination location of the content item, the second state comprising the predicted state of the content item after the operation is performed.

8. The method of claim 7, further comprising:
retrieving the first state of the source location from a first table of state data of the source location;
based on the first state and the operation, determining the second state of the destination location;
updating, based on the second state, a second table of state data of the destination location to include the predicted state; and
providing the predicted state to the client device, the predicted state causing the content item to appear at the destination location while the move operation is in progress.

9. The method of claim 7, wherein determining the first state comprises determining a first predicted result of deleting the content item from the source location, wherein determining the second state comprises determining a second predicted result of adding the content item to the destination location, wherein the first state is based on the first predicted result and the second state is based on the second predicted result.

10. The method of claim 1, wherein the operation comprises a namespace operation, wherein the namespace operation comprises at least one of mounting a new namespace for the user account and partitioning the content item to create the new namespace, and wherein determining the predicted state of the content item comprises:
verifying that the user account has permissions that allow the user account to access the new namespace associated with the namespace operation;
prior to generating the new namespace, pre-allocating a namespace identifier to the new namespace;
computing the predicted state for the new namespace; and
providing, in the response to the request to access the content item, the predicted state for the new namespace, the predicted state comprising the namespace identifier and a namespace state of the new namespace.

11. A content management system comprising:
one or more processors; and
at least one non-transitory computer readable medium having stored thereon instructions that, when executed by the one or more processors, cause the one or more processors to:
receive, from a client device associated with a user account registered at the content management system, a request to access a content item stored at the content management system, the request being received prior to completing or performing an operation on the content item that was initiated before the request;
in response to the request to access the content item, determine a predicted state of the content item, the predicted state of the content item reflecting a result of performing the operation on the content item; and provide a response to the request to access the content item while the operation is in progress, the response including the predicted state of the content item that causes at least one of the content item, a parent content item associated with the content item, or a child content item of the content item to appear, as if the operation has been completed.

12. The content management system of claim 11, the at least one non-transitory computer readable medium having stored thereon instructions that, when executed by the one or more processors, cause the content management system to:

receive, from a different client device, a request to perform the operation on the content item, the request to perform the operation being received prior to the request to access the content item; and add the operation to a queue of operations at the content management system.

13. The content management system of claim 11, wherein determining the predicted state of the content item comprises:

determining a state of the content item corresponding to a time before the operation;

determining the result of performing the operation on the content item; and based on the result of performing the operation on the content item, determining the predicted state of the content item.

14. The content management system of claim 13, wherein providing the response to the request to access the content item comprises:

modifying the state of the content item to reflect the predicted state of the content item; and providing the content item according to the predicted state.

15. The content management system of claim 11, wherein the operation comprises a set of atomic operations, and wherein determining the predicted state of the content item comprises:

determining one or more interdependencies of the set of atomic operations; and sequentially computing a result of performing the set of atomic operations according to the one or more interdependencies.

16. The content management system of claim 11, wherein the operation comprises a move operation, and wherein determining the predicted state of the content item comprises:

determining a first state of a source location of the content item, the first state of the source location corresponding to a time before the operation was initiated or completed; and determining a second state of a destination location of the content item, the second state comprising the predicted state of the content item after the operation is performed.

17. The content management system of claim 11, wherein the operation comprises a namespace operation, wherein the namespace operation comprises at least one of mounting a new namespace for the user account and partitioning the content item to create the new namespace, and wherein determining the predicted state of the content item comprises:

verifying that the user account has permissions that allow the user account to access the new namespace associated with the namespace operation;

prior to generating the new namespace, pre-allocating a namespace identifier to the new namespace;

computing the predicted state for the new namespace; and providing, in the response to the request to access the content item, the predicted state for the new namespace, the predicted state comprising the namespace identifier and a namespace state of the new namespace.

18. A non-transitory computer-readable medium comprising instructions, the instructions, when executed by one or more processors, cause the one or more processors to:

receive, from a client device associated with a user account registered at a content management system, a request to access a content item stored at the content management system, the request being received prior to completing or performing an operation on the content item that was initiated before the request;

in response to the request to access the content item, determine a predicted state of the content item, the predicted state of the content item reflecting a result of performing the operation on the content item; and provide a response to the request to access the content item while the operation is in progress, the response including the predicted state of the content item that causes at least one of the content item, a parent content item associated with the content item, or a child content item of the content item to appear, as if the operation has been completed.

* * * * *